(12) United States Patent
Janis

(10) Patent No.:     US 12,656,751 B2
(45) Date of Patent:     *Jun. 16, 2026

(54) VIRTUAL GRID SYSTEM AND METHOD

(71) Applicant: Ivy Energy, Inc., San Diego, CA (US)

(72) Inventor: Dover Janis, San Diego, CA (US)

(73) Assignee: IVY ENERGY, INC., San Diego, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 19/002,894

(22) Filed: Dec. 27, 2024

(65) Prior Publication Data

US 2025/0130549 A1     Apr. 24, 2025

Related U.S. Application Data

(63) Continuation of application No. 17/821,053, filed on Aug. 19, 2022, now Pat. No. 12,216,447, which is a
(Continued)

(51) Int. Cl.
*G06Q 50/06*     (2024.01)
*G05B 19/402*     (2006.01)
*G06Q 10/0631*     (2023.01)

(52) U.S. Cl.
CPC ..... *G05B 19/402* (2013.01); *G06Q 10/06315* (2013.01); *G06Q 50/06* (2013.01); *G05B 2219/2639* (2013.01)

(58) Field of Classification Search
CPC .......... G05B 19/402; G05B 2219/2639; G06Q 10/06315; G06Q 50/06
(Continued)

(56) References Cited

U.S. PATENT DOCUMENTS

| | | | | |
|---|---|---|---|---|
| 11,437,822 B2 * | 9/2022 | Daniel | .................. | F03D 9/25 |
| 2007/0219932 A1 * | 9/2007 | Carroll | ................ | G06Q 50/06 |
| | | | | 705/412 |

(Continued)

FOREIGN PATENT DOCUMENTS

| | | | | | |
|---|---|---|---|---|---|
| CA | | 2739267 A1 * | 4/2010 | ............ | G06Q 20/10 |
| WO | WO-2014066087 A1 * | | 5/2014 | ........ | H02J 13/00034 |

(Continued)

OTHER PUBLICATIONS

Peters, Adele, "In this new solar-powered apartment complex, all 600 units have batteries that form a virtual power plant", Aug. 27, 2019, fastcompany.com; 4 pages (Year: 2019).*
(Continued)

*Primary Examiner* — Shannon S Campbell
*Assistant Examiner* — Freda A Nelson
(74) *Attorney, Agent, or Firm* — Husch Blackwell LLP; Rachael Lea Leventhal

(57)     ABSTRACT

A virtual energy grid system for a location including tenant spaces (TSs) in a building, receiving grid energy (GE) from a utility grid and renewable energy (RE), including: a computer system: communicating with energy consumption meters, each measuring energy use by a respective TS, communicating with an energy production meter measuring the RE produced by the RE source, receiving, from the energy production meter, energy production information of the RE during a time period, the computer system including an appliance automation module sending a signal to automatically energize or de-energize energy-consuming devices to prioritize use of the RE, receiving: from each energy consumption meter, energy consumption information for each TS during the time period, total RE produced, and total supplied GE, and calculating an energy benefit allocation for each TS, and outputting a report for the time period for each
(Continued)

Example System (10)
20
70
80
50
40    30A 30B 30C
60

TS that includes the respective TS's energy benefit allocation.

22 Claims, 18 Drawing Sheets

Related U.S. Application Data continuation of application No. PCT/US2021/018894, filed on Feb. 19, 2021.

(60) Provisional application No. 62/979,919, filed on Feb. 21, 2020.

(58) Field of Classification Search
USPC .......................................... 700/286; 705/412
See application file for complete search history.

(56) References Cited

U.S. PATENT DOCUMENTS

| | | | | |
|---|---|---|---|---|
| 2008/0281473 A1* | 11/2008 | Pitt | ........................ | G06Q 50/06 |
| | | | | 705/412 |
| 2011/0282511 A1 | 11/2011 | Unetich | | |
| 2012/0130556 A1* | 5/2012 | Marhoefer | ............. | G06Q 10/04 |
| | | | | 700/291 |
| 2015/0094968 A1* | 4/2015 | Jia | .......................... | G05B 15/02 |
| | | | | 702/60 |
| 2016/0118795 A1 | 4/2016 | Berkowitz | | |
| 2019/0094270 A1 | 3/2019 | Overcast et al. | | |

FOREIGN PATENT DOCUMENTS

| | | |
|---|---|---|
| WO | 2015013658 A2 | 1/2015 |
| WO | 2020120591 A1 | 6/2020 |

OTHER PUBLICATIONS

"Virtual Net Energy Metering at Multitenant Buildings", Feb. 2013, sfenvironment.org, 12 pages. (Year: 2013).*

PCT International Search Report & Written Opinion of the International Searching Authority; Application No. PCT/ US21/18894; Completed: Jun. 3, 2021; Mailing Date: Jun. 29, 2021; 16 Pages.

International Preliminary Report on Patentability; Application No. PCT/US2021/018894; Completed: Jun. 1, 2022; Issued: Jun. 22, 2022; 36 Pages.

"How is 3AM Electricity Different from 6PM Electricity?", Jun. 17, 2016, blog.sense.com, 4 pages. (Year: 2016).

\* cited by examiner

Example System (10)

Example System (10)

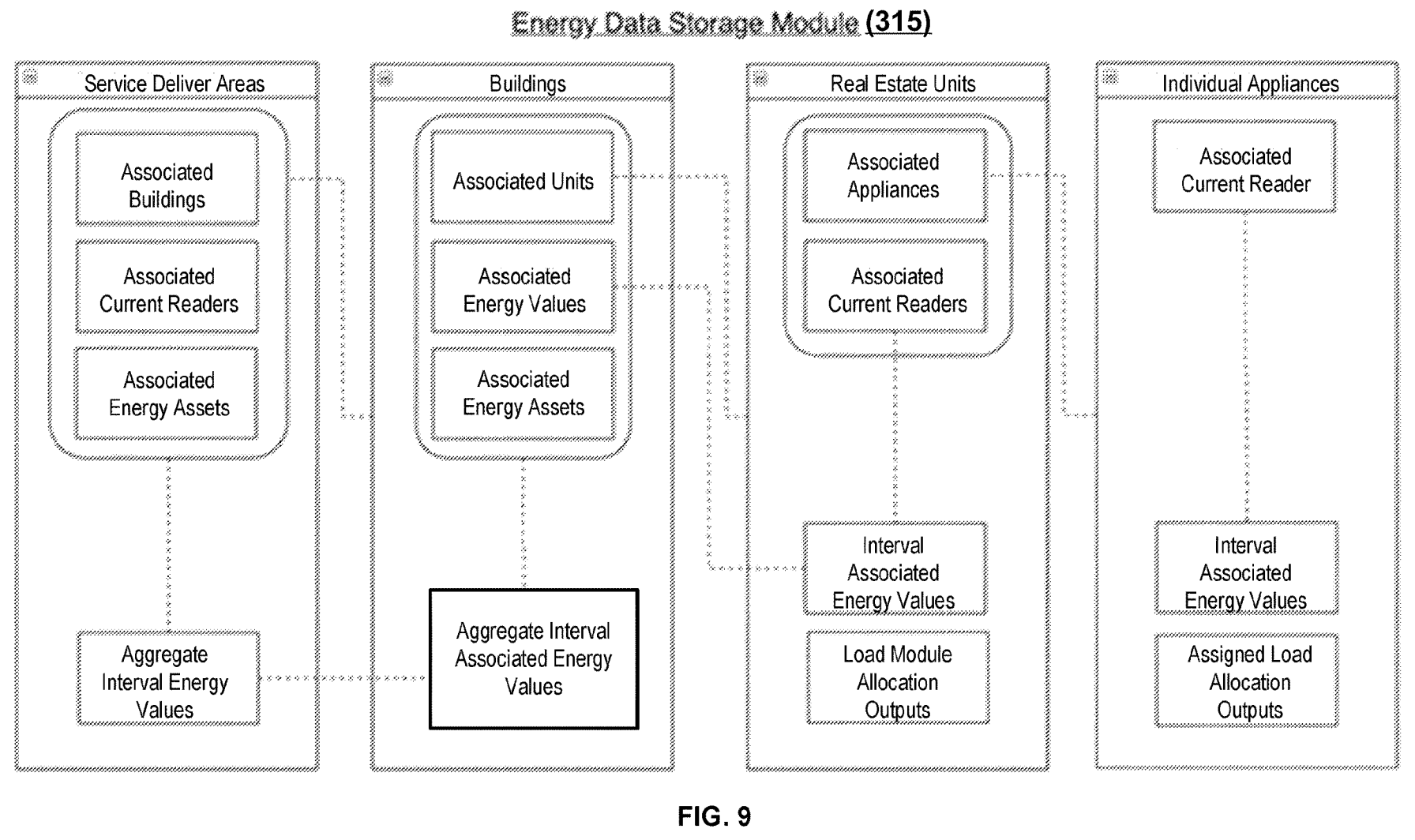

Energy Data Storage Module (315)

Individual Appliances

Associated Current Reader

Interval Associated Energy Values

Assigned Load Allocation Outputs

Real Estate Units

Associated Appliances

Associated Current Readers

Interval Associated Energy Values

Load Module Allocation Outputs

Buildings

Associated Units

Associated Energy Values

Associated Energy Assets

Aggregate Interval Associated Energy Values

Service Deliver Areas

Associated Buildings

Associated Current Readers

Associated Energy Assets

Aggregate Interval Energy Values

FIG. 9

Avoided Cost module (345)

Time Of Use Module (355)

Appliance Automation Module (375)

Interval Event Processing

Determined Onsite Energy Surplus

Manual Override On/Off

Time of Use Scheduled Run Logic

Configure On/Off

Load Allocation Module 335

User Interface Module API 395

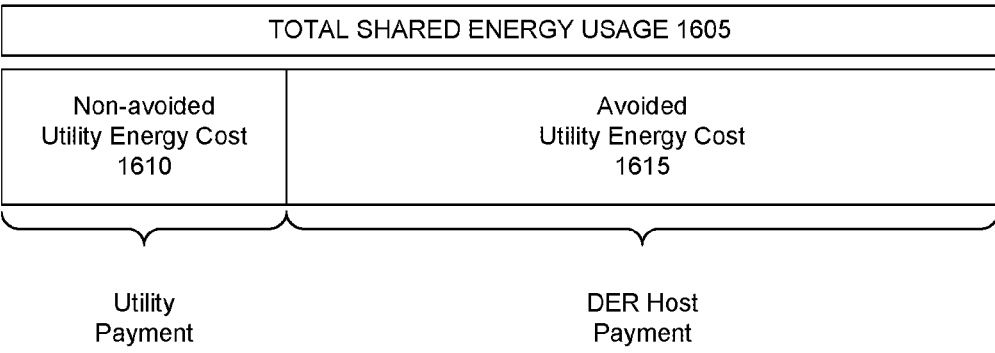
FIG. 16
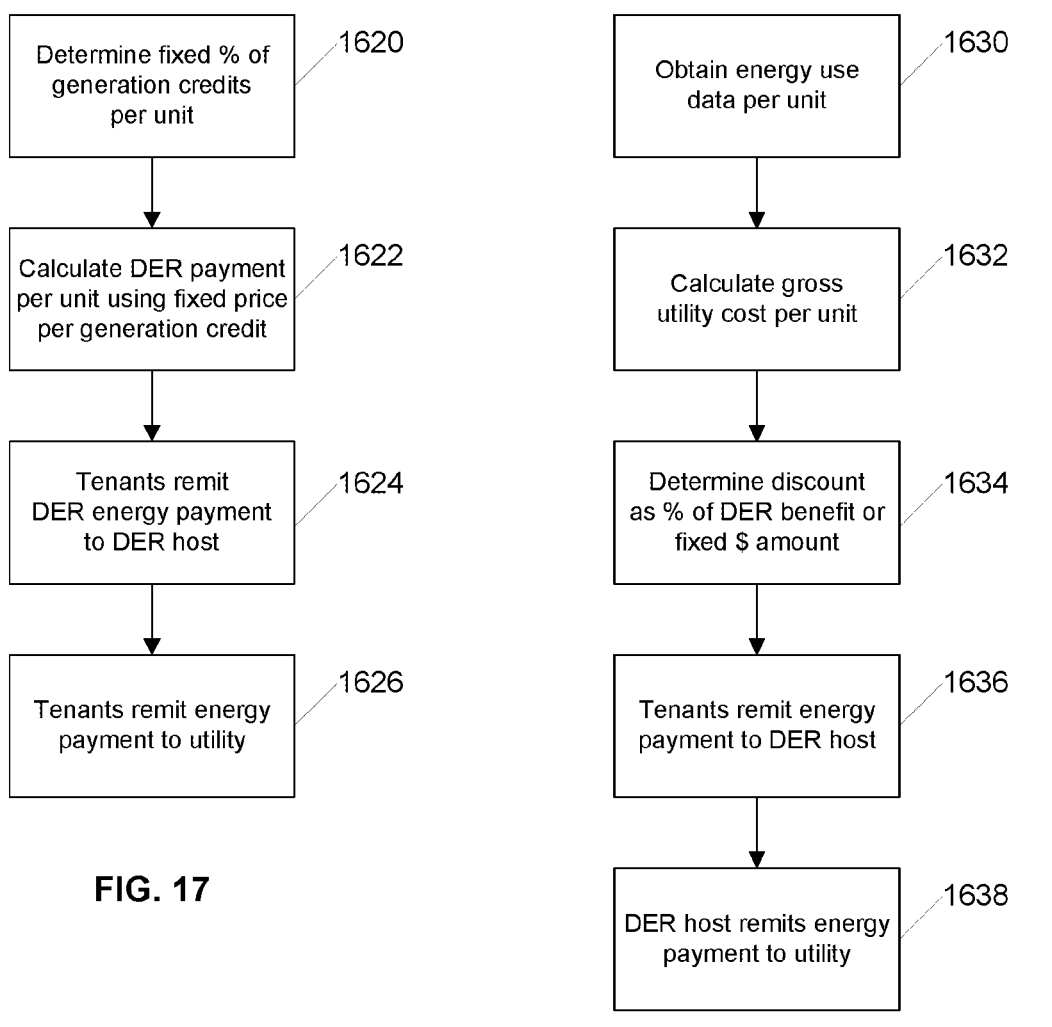
FIG. 17
FIG. 18

VIRTUAL GRID SYSTEM AND METHOD

CROSS-REFERENCE TO RELATED APPLICATION(S)

The present application is a continuation of and claims the benefit of U.S. patent application Ser. No. 17/821,053, filed on Aug. 19, 2022, which is a continuation of International Patent Application No. PCT/US2021/018894, filed on Feb. 19, 2021, which claims priority to and the benefit of U.S. Provisional Patent Application No. 62/979,919, filed on Feb. 21, 2020, the entire disclosure of each of which is incorporated herein by reference for all purposes.

BACKGROUND

Field of the Invention

The present disclosure is generally directed toward a virtual grid system for shared use of an energy producing asset by individual units of a multi-unit residential building and more specifically directed toward systems and methods for tracking and allocating shared use of an energy producing asset by individual units of a multi-unit residential building.

Related Art

Owners of locations having multiple subdivided tenant spaces, such as multi-unit buildings, for example, residential buildings (e.g., apartment buildings, condos, or flats), commercial buildings (e.g., shopping centers or malls), or multi-use buildings, are increasingly installing energy producing assets, e.g., renewable energy sources, such as solar panels, heat pumps, or wind turbines, to satisfy the demand of tenants for sustainable onsite energy production and less expensive energy expenses. However, a problem with such energy producing assets is that the energy produced is partially consumed by the multi-unit building and various common areas in the location, and the remainder of the energy produced is pushed onto the grid. The owner of the multi-unit residential building is unable to sell the energy produced and the benefit of the energy producing asset is largely unrealized.

Therefore, what is needed is a system and method that overcomes these significant problems found in the conventional systems as described above.

SUMMARY

Accordingly, the present disclosure provides a virtual grid system that enables shared use of one or more distributed energy resources ("DERs") by multi-unit buildings and allocation of the benefits of such shared use to individual units. In an embodiment, the system includes one or more DER producing assets configured to generate electrical energy and deliver the electrical energy to a multi-unit building having a plurality of individual units, each configured with a corresponding individual unit electrical panel. The system also includes a production current reader electrically coupled with the energy producing asset and configured to track an amount of electrical energy produced by the energy producing asset and communicatively coupled with a data communication network. The system also includes a junction configured to receive electrical energy from the energy producing asset and deliver the electrical energy to a plurality of individual unit electrical panels for consumption by one or more usage appliances within the plurality of individual units. The system also includes a plurality of usage current readers, each configured to track an amount of electrical energy used by an individual unit and each communicatively coupled with the data communication network. The system also includes a virtual grid server communicatively coupled with the production current reader and the plurality of usage current readers via the data communication network. The virtual grid server is configured to obtain energy production information for the energy producing asset, wherein the energy production information comprises a plurality of pairs of an amount of energy produced and a corresponding time interval during which the amount of energy was produced. The server is also configured to obtain energy usage information for each of the individual units of the multi-unit building, wherein the energy usage information for an individual unit comprises a plurality of pairs of an amount of energy used and a corresponding time interval during which the amount of energy was used. The server is also configured to allocate a first amount of energy produced during a first time interval to each individual unit in a first plurality of individual units based on a first amount of energy consumed by each respective individual unit during the first time interval, wherein the allocated first amount of energy produced may be different for each of the individual units in the first plurality of individual units. The server is also configured to allocate a second amount of energy produced during a second time interval to each individual unit in a second plurality of individual units based on a second amount of energy consumed by each respective individual unit during the second time interval, wherein the allocated second amount of energy produced may be different for each of the individual units in the second plurality of individual units. The server is also configured to calculate an energy cost allocation for each individual unit in the multi-unit building based at least in part on the allocated first amount of energy produced during the first time interval and the allocated second amount of energy produced during the second time interval.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 9 is a diagram illustrating example functionality of an energy data storage module according to an embodiment of the invention;

FIG. 16 is a block diagram illustrating an example breakdown of total shared energy usage according to an embodiment of the invention;

FIG. 17 is a flow diagram illustrating an example process for allocating shared use DER benefits according to an embodiment of the invention;

FIG. 18 is a flow diagram illustrating an example process for allocating shared use DER benefits according to an embodiment of the invention;

DETAILED DESCRIPTION

Embodiments disclosed herein provide for a virtual grid system that enables distributed use of electrical energy produced by an energy producing asset and allocation of such distributed use to individual units in a multi-unit building. For example, one method disclosed herein allows for energy production by the energy producing asset to be tracked in time intervals and energy usage by individual units in the multi-unit building to be similarly tracked in time intervals and then usage of the energy produced by the energy producing asset to be allocated to the individual units. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
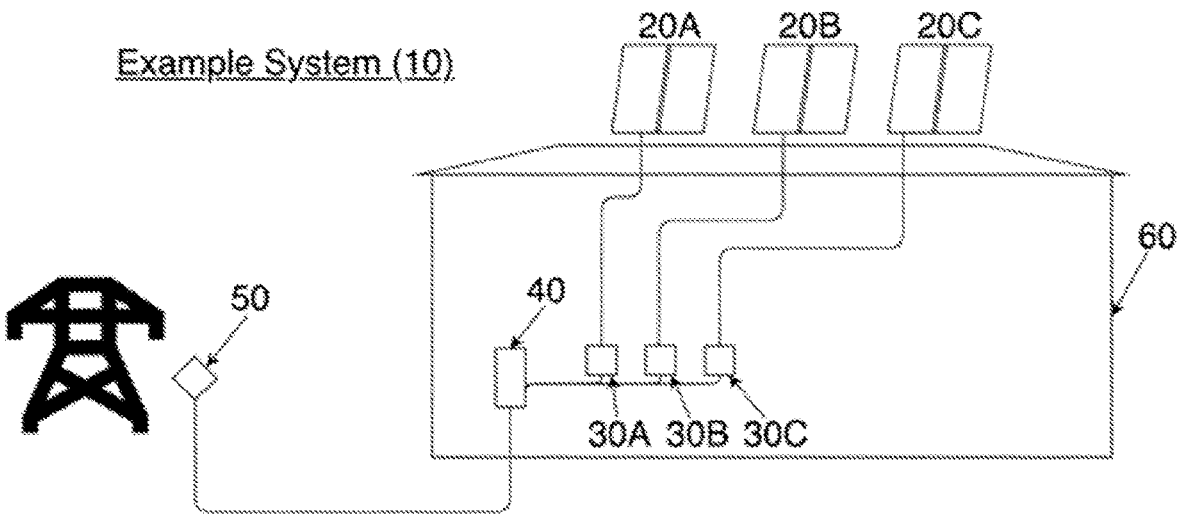
FIG. 1A is a diagram illustrating an example system for shared use of a DER producing asset according to an embodiment of the invention.

FIG. 1A is a diagram illustrating an example system (10) for shared use of an energy producing asset (20) by individual units in a multi-unit building (60) according to an embodiment of the invention. In the illustrated embodiment, three solar systems (20A) (20B) (20C) are connected to three individual electrical panels (30A) (30B) (30C) associated to specific individual units. This diagram illustrates a 1:1 relationship between solar arrays and individual units. This is an inefficient and expensive method to use solar production to offset energy consumption due to the need for multiple wired connection runs between the solar system and the electrical panels.

Figure 1B:
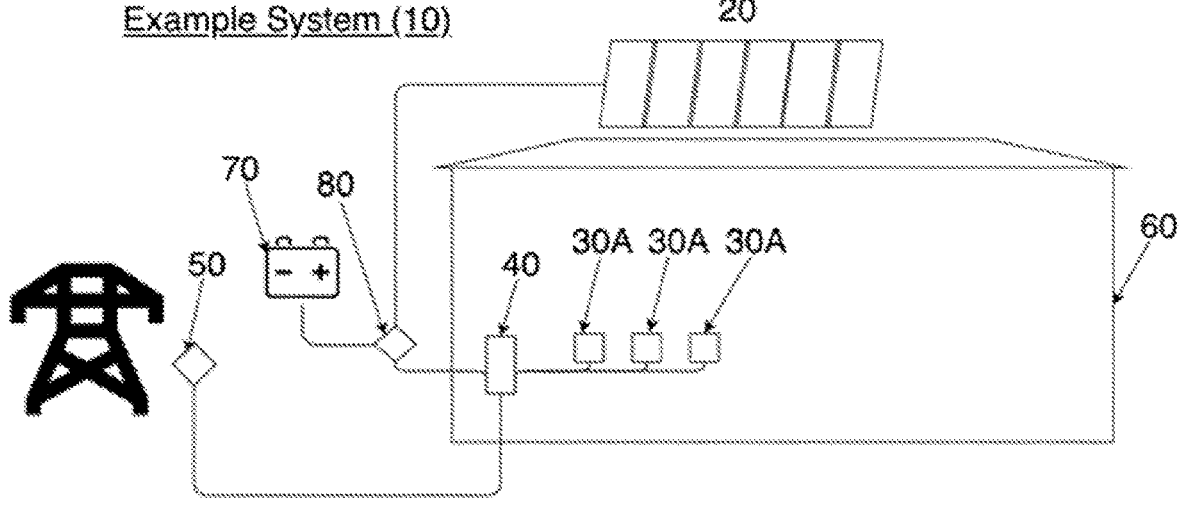
FIG. 1B is a diagram illustrating an example system for shared use of a DER producing asset according to an embodiment of the invention.

FIG. 1B is a diagram illustrating an example system (10) for shared use of an energy producing asset (20) according to an embodiment of the invention. This diagram illustrates a single solar system (20) connecting to a DC/AC junction (80) that is coupled the main building electrical bussing (40) alongside a potential battery (70). The main electrical bussing (40) is now linked to the utility grid via transformer (50), the DC/AC junction (80) and the individual dwelling unit electrical panels (30A) (30B) (30C). This system allows for the solar production and discharged storage to be shared throughout the individual dwelling units of the multifamily dwelling (60).

Figure 1C:
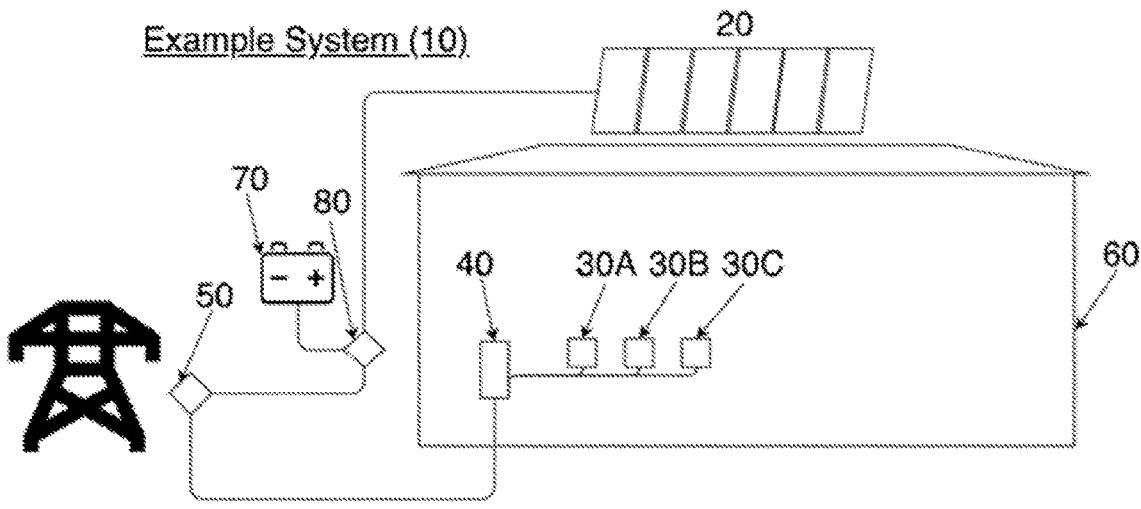
FIG. 1C is a diagram illustrating an example system for shared use of a DER producing asset according to an embodiment of the invention.

FIG. 1C is a diagram illustrating an example system (10) for shared use of an energy producing asset (20) according to an embodiment of the invention. This diagram represents a single solar system (20) connecting to a DC/AC junction (60) that is coupled to a utility transformer (50) that feeds the building electrical bussing (40) alongside a potential battery (70). The utility transformer (50) is linked to the utility grid, the DC/AC junction (80) and the main building electrical bussing (40). The main building electrical bussing (40) feeds the individual dwelling unit electrical panels (30A) (30B) (30C), allowing the solar energy produced and the energy stored in the battery (70) that gets discharged to be shared throughout the individual dwelling units.

Figure 2:
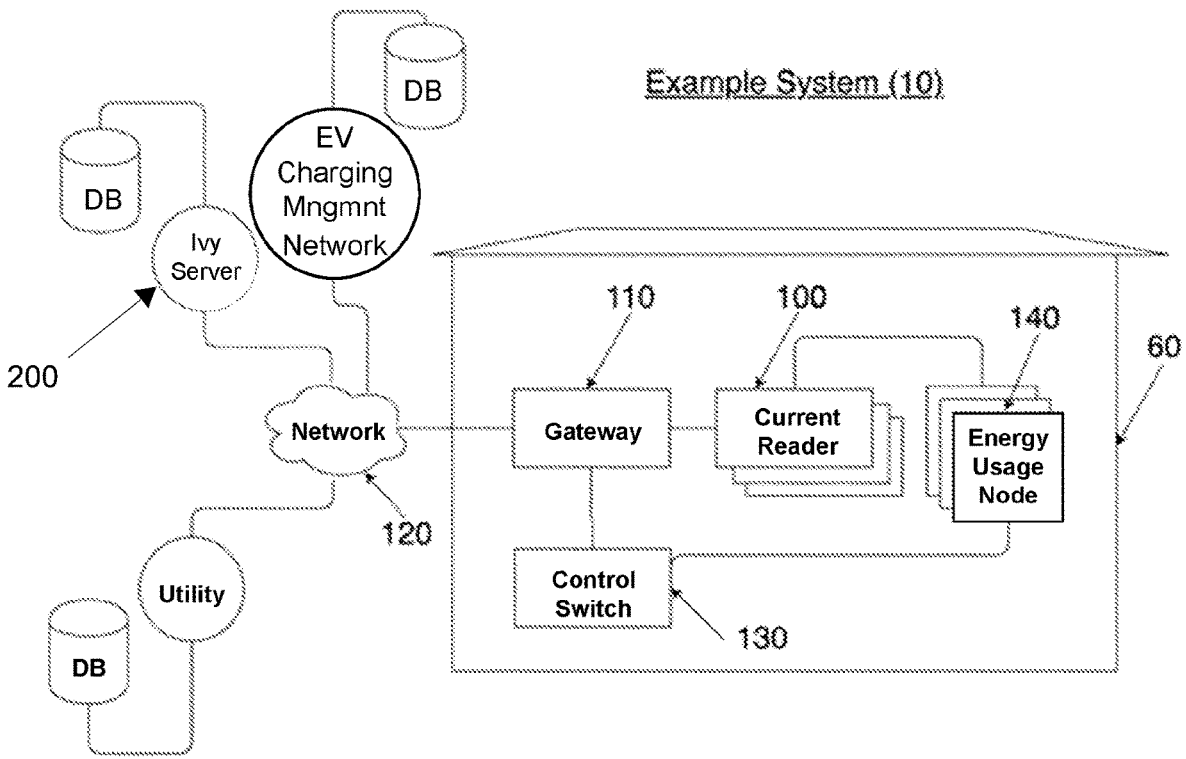
FIG. 2 is a diagram illustrating an example system for shared use of a DER producing asset and communication system according to an embodiment of the invention.

FIG. 2 is a diagram illustrating an example physical configuration of a virtual grid server and related components in a system (10) that correlate energy data and actions within the virtual grid network according to the embodiment of the invention. In the illustrated embodiment, energy consumption is monitored through existing or new current transmitter ("CT") Readers (100) linked to each individual dwelling unit that relay real-time usage data to a central gateway system (110) connected to the site network (120). A CT Reader (100) and a control switch (130) could be a combined component allowing electron usage control to be determined by the network (120). The energy usage nodes (140) inside the network comprise major appliances such as an electric vehicle charger or water heater, or unitary real estate within a property such as a leased unit or separate building on a property. A CT Reader (100) could comprise but is not limited to a device such as a utility meter, a magnetic current reader as a stand-alone component, or an embedded CT Reader inside of an appliance. The data collected is interpreted by the Ivy Server (virtual grid server 200) and used for purposes as described later with respect to FIG. 5. In one embodiment, API language can be used to access energy usage node data stores.

Figure 3:
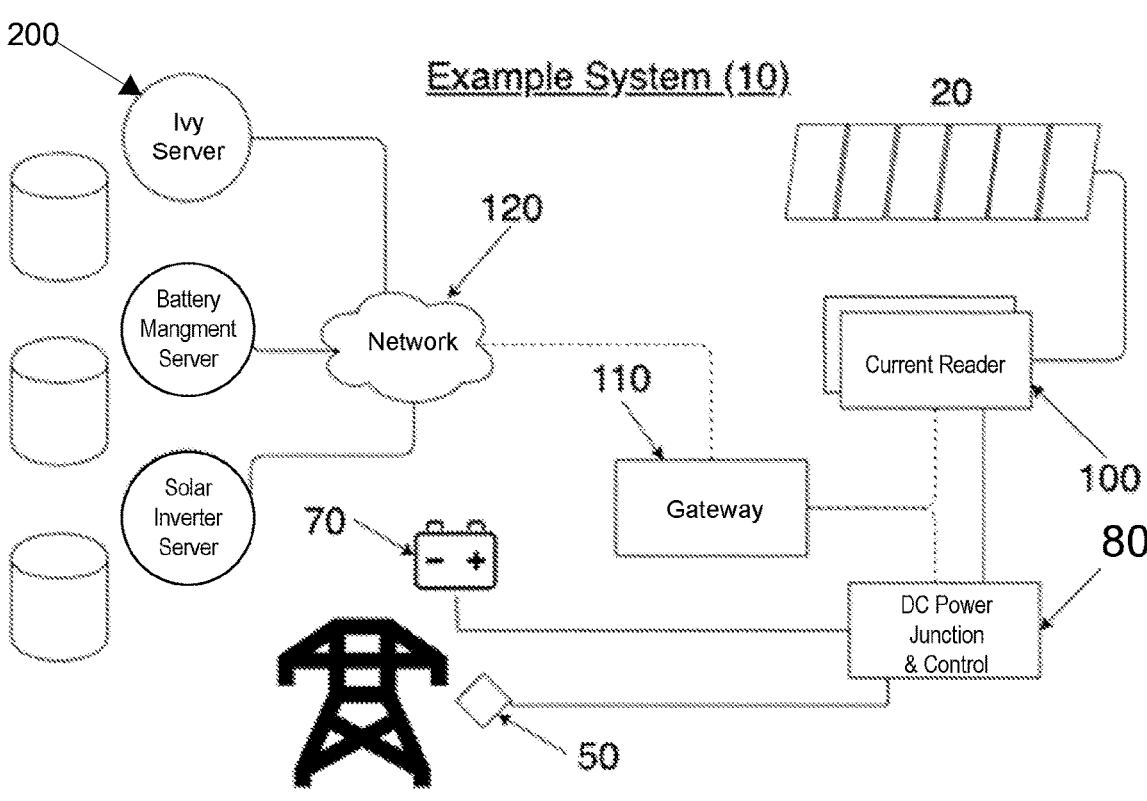
FIG. 3 is a diagram illustrating an example system for monitoring and control of energy production by a shared DER producing asset according to an embodiment of the invention.

FIG. 3 is a diagram illustrating an example system (10) for monitoring and control of energy production by a shared energy producing asset (20) according to an embodiment of the invention. Current readers (100) are used to track energy production amounts which will be connected to a gateway (110) that will send data to the network (120), also a battery Power Junction & Control Unit (150) will be accessed via the gateway (110) to allow the network (120) to control in and out electron flow to and from the battery storage unit (70).

Figure 4:
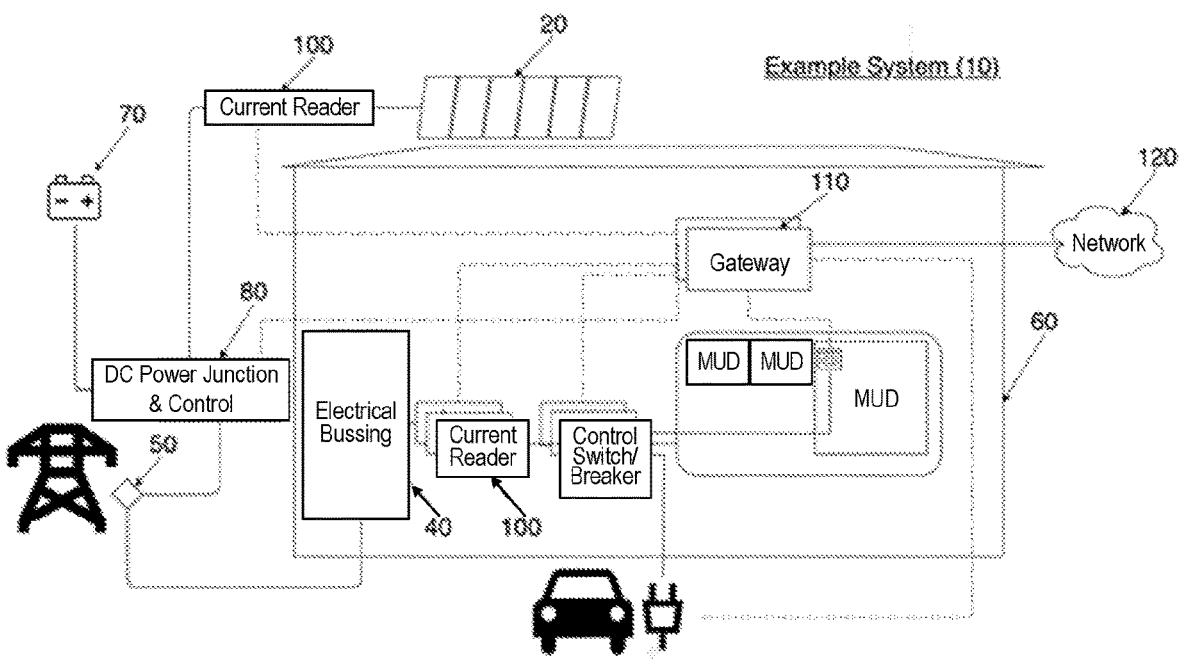
FIG. 4 is a diagram illustrating an example system for shared use of a DER producing asset according to an embodiment of the invention.

FIG. 4 is a diagram illustrating an example system (10) including electrical and data connections between elements of the system (10). In the illustrated embodiment of FIGS. 2, 3, and 4, dotted lines represent data connections and solid lines represent electrical connections.

Figure 5:
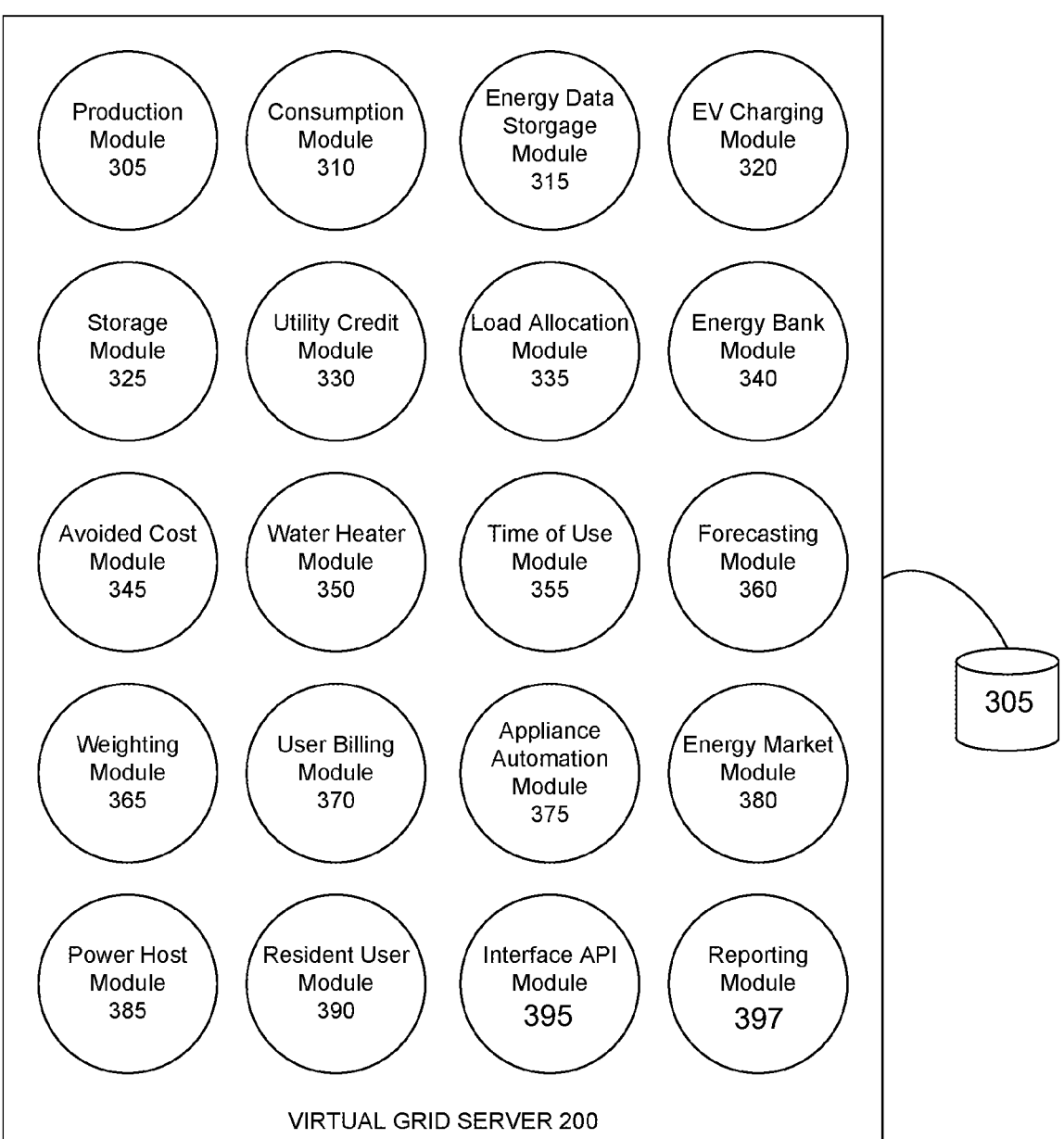
FIG. 5 is a diagram illustrating an example server system for shared use of a DER producing asset according to an embodiment of the invention.

FIG. 5 is a diagram illustrating an example virtual grid server (200) and various software modules that execute on the virtual grid server (200) according to an embodiment of the invention. In the illustrated embodiment, the virtual grid server (200) includes a production module 305, a consumption module 310, an energy data storage module 315, an EV charging module 320, a storage module 325, a utility credit module 330, a load allocation module 335, an energy bank module 340, an avoided cost module 345, a water heater module 350, a time of use module 355, a forecasting module 360, a weighting module 365, a user billing module 370, an appliance automation module 375, an energy market module 380, a power host module 385, a resident user module 390, an interface module 395, and a reporting module 397.

The virtual grid system has a work processing design that will use triggers from these modules to perform processing tasks that accomplish the physical goals of the virtual grid system using specific modules separately. The data is collected from modules that have a data collection processing task to retrieve energy data nodes through associated API's or network connections such as the production module, consumption module, water heater module, EV charging module, and storage module. The virtual grid system then has another layer of data collection to help with the output processing used to generate real time events and value distribution outputs within the virtual grid environment such modules include the time of use module, energy market module, and utility credit module. The data collection tasks performed by these modules are different from the energy node collection work processing tasks because they are collecting real time up to date benchmarking information on external characteristics such as utility tariff changes, regional energy market pricing trends, and external pricing indications that affect the virtual benchmarks used within the virtual grid environment. Ultimately the combination of these software modules used by the virtual grid categorize these external benchmarks and the energy data nodes collected in a unique way to then process the data to creating events that drive physical value adding results within the application and enable physically applicable methodology behind the value distribution of the physically generated assets and their given value. This physical value generated is made up inside the work processing modules that each have their own dedicated purpose within the virtual grid environment.

The production module 305 is configured to collect energy production data from within the physical devices within the virtual grid system and store it in the Ivy Server (virtual grid server 200) ready to be used by other relevant modules for their use case.

The production module will store associated solar systems and inverter (CT's) energy production history and will assign the energy production assets to the correct virtual grid system so that the allocation module can use the correct datasets inside of the Ivy Server (virtual grid server 200).

The consumption module 310 is configured to collect the energy usage information from the different nodes within the virtual grid system and store and associate the data points to the correct physical attribute such as an appliance, real estate unit, or building.

The consumption module will associate meters (CT's) to users inside of the ivy software and will API to meter management networks to refresh energy usage data streams. The consumption module will also store associated authorization data inputs needed to connect to specific meter networks such as a utility.

The energy data storage module 315 is a work process module that correlates and compresses historical energy data into optimized long term storage formats.

The EV charging module 320 is configured to operate similarly to the appliance module. The difference is that rather than the EV charging appliance being classified as a unit property it could be shared by users that live on the property. The EV charging module will associate users as they use the appliance to the amount of energy used and to a unit which allows the usage dataset to be formulated inside of the allocation & billing module.

The storage module 325 is configured to connect to 3rd party battery load control systems and set preferences for how the Ivy Software will interface with battery management based on potential outcomes of the allocation load module. This module will then identify optimization patterns based on load balance information within the virtual grid and communicate events to the storage devices within the virtual grid system.

The utility credit module 330 is configured to identify the format in which a utility credit or incentive is generated and create a work process to input the needed energy data information from the virtual grid system. The module will store preferences for making these calculations and store the different criteria or options in which the virtual grid can use.

Figure 6:
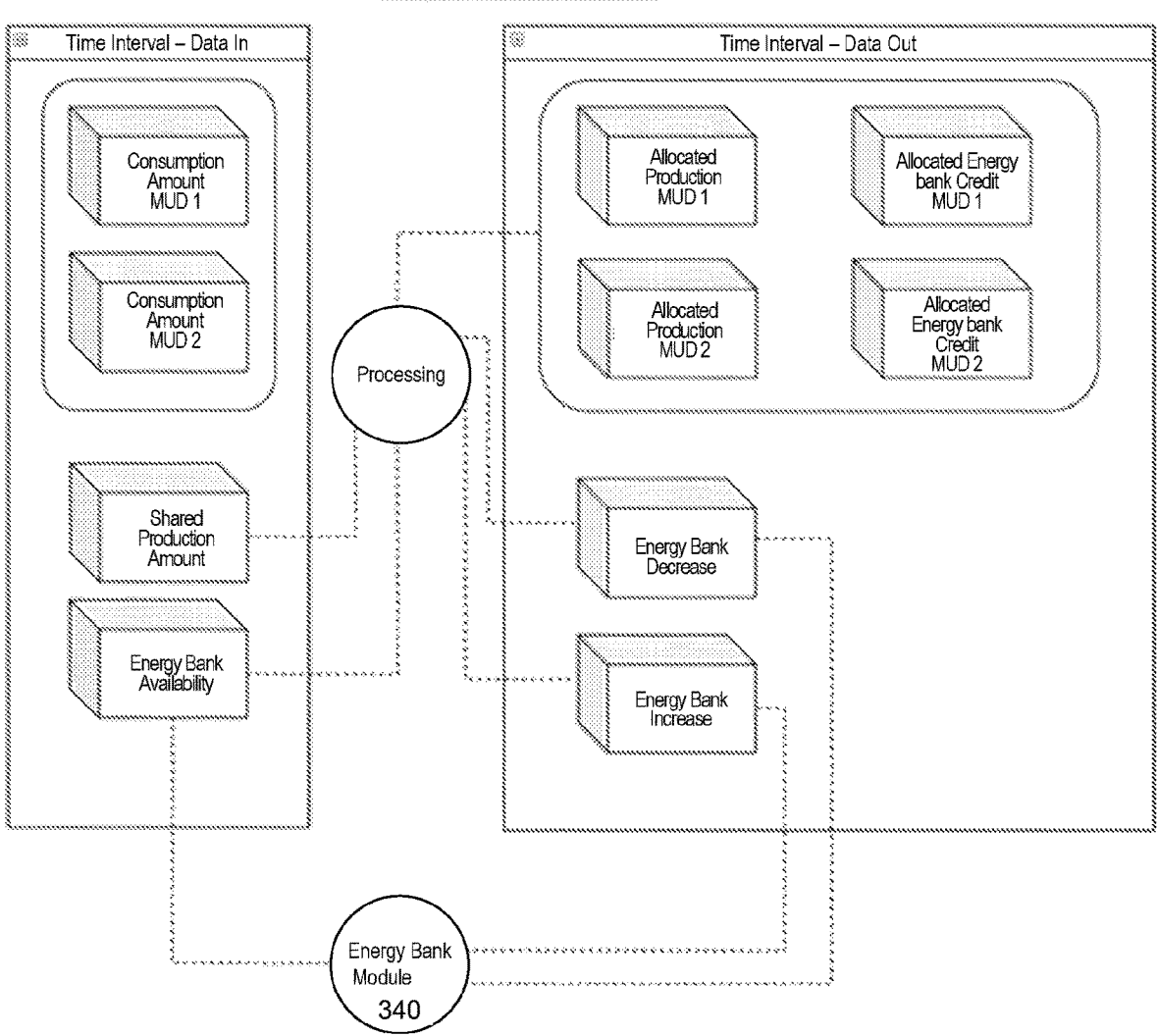
FIG. 6 is a diagram illustrating example functionality of a load allocation module according to an embodiment of the invention.

The load allocation module 335 is configured to interpret all of the generation and usage nodes on a property and will determine the virtual generation allocation as shown and described in more detail with respect to FIG. 6.

The energy bank module 340 is configured to communicate with the allocation module to represent the price segment of surplus energy generated on a property and how that energy fits into the load allocation outputs based on time of use energy differences.

The avoided cost module 345 is configured to calculate what a unit would have paid the utility company during a given time period.

The water heater module 350 is configured to communicate load balance information from the virtual grid system to individual water heater appliances across the environment based optimal usage times or on user preferences.

The time of use module 355 is configured to be an active repository of time of use segments available to a virtual grid system based on utility pricing structures.

The forecasting module 360 is configured to use relevant data sets recorded over time inside of the virtual grid server 200 to predict energy load peaks, shifts, and surplus energy generation events. The relevant data sets will be scored once real data is obtained and these scores will be used to validate future predictions based on score trends. Potential types of historical data obtained from the virtual grid system and how the data process works is shown in more detail in FIG. 15.

The weighting module 365 is configured to weight each unit's usage loads against each other based on positive usage behavior and external utility pricing signals and distribute the shared financial incentives identified by the utility credit module based on each unit's weighted usage.

The user billing module 370 is configured to pick up the outputs from the weighting and avoided cost module to generate a billing output that is delivered to a user that lives within the property. This module will reference variables such as when and how the outputs will be delivered to a user based on the settings inside of the Power Host and Resident User interface modules.

The appliance automation module 375 is configured to communicate load balance information within the virtual grid system and push event actions to those applicable appliances such as when it is optimal to use energy based on surplus generation events in real time.

Then energy market module 380 is configured to host a repository of external references related to energy market pricing that can be used and incorporated into the forecasting module and automation module to help user energy behavior adopt to energy market price indications.

The power host module 385 is configured to store preferences that indicate the desired variables associated to a property owner account or stakeholder. The variables will then reference a needed module such as equal discount logic and equal pricing information that the user billing module will use.

The resident user module 390 is configured to allow users to access their consumption data sets, virtual allocation history, avoided rate criteria and inputs, associated appliances, solar billing history, and notifications for optimizing energy behavior.

The interface module 395 is configured to allow a user with associated data inside of the virtual grid system to visualize data trends, suggestions, or preferences. Such preferences or data trends could include suggestions on when automation events would occur, what types of events they want to be notified about, and energy usage patterns.

The reporting module 397 is configured to allow owners or stakeholders involved in a property to view the different summary or detailed data sets from these modules.

FIG. 6 is a diagram illustrating an example functionality of the load allocation module (335) according to an embodiment of the invention. In the illustrated embodiment, the load allocation module (335) is configured to identify all of the usage benchmarks inside of a property behind the service delivery point. The load allocation module (335) is configured to automatically run during each time interval of 6 seconds-15 minutes based on a predetermined election. This mathematical process will be called a data process loop. The loop will apply the shared generation load across the multiple usage nodes to a virtual allocation ledger associated to the user or Multiple Unit Dwelling ("MUD") based on their real consumption at that time. This load allocation module (335) will equally distribute the generation load across ledgers up to the usage benchmark of a node equally. This output metric is called virtual distributed energy resource allocation ledger. This load allocation module (335) will also communicate with the energy bank module and determine the time stamped energy bank decrease or increase amounts within the loop according to load net differences. This load allocation module (335) will also determine a property wide aggregated need for electricity from beyond the utility electricity delivery point meaning that each interval there will either be a credit generated for too much electricity produced vs consumed or a need for electricity from outside the property.

Figure 7:
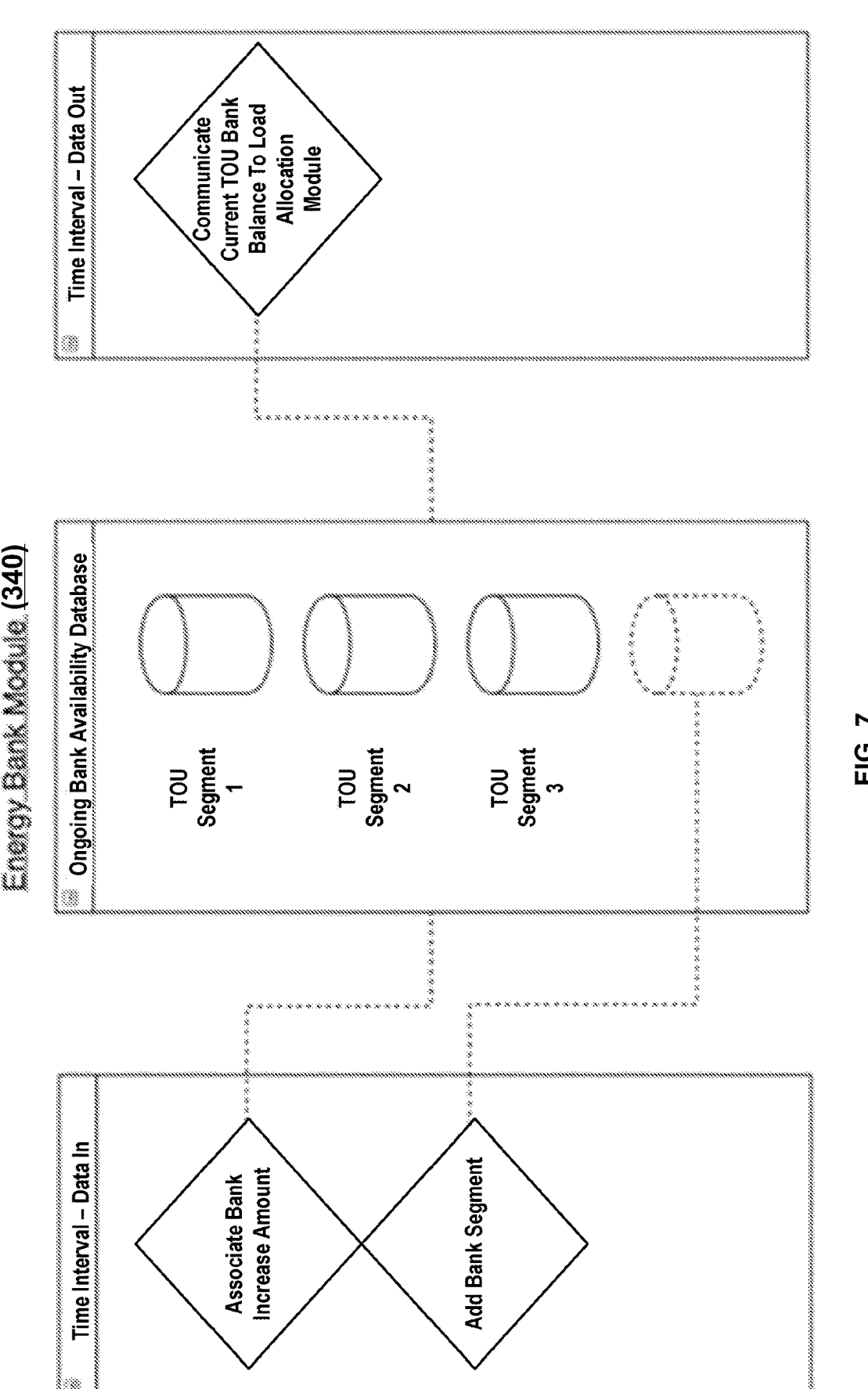
FIG. 7 is a diagram illustrating example functionality of an energy bank module according to an embodiment of the invention.

FIG. 7 is a diagram illustrating an example functionality of the energy bank module (340) according to an embodiment of the invention. In the illustrated embodiment, the energy bank module (340) is configured to keep track of surplus produced energy given real time of generation and usage comparison which will be identified in the allocation module. For example if 20 kWh of extra energy is assessed to be generated at a given time period the 20 kWh will be associated to a specific Time Of Use "TOU" bank availability to be tracked and applied at a later time. The reapplying process will first use availability from the direct TOU associated to the usage need identified in the allocation module and then will follow a priority list. If the same TOU segment has no availability it will pull from the next TOU bank in line but the credit will be referenced at the correct TOU value from when it was generated vs used so that the credit is weighted fairly in the weighting module. This data will be referenced in the load allocation module (335) and weighting module (365).

Figure 8:
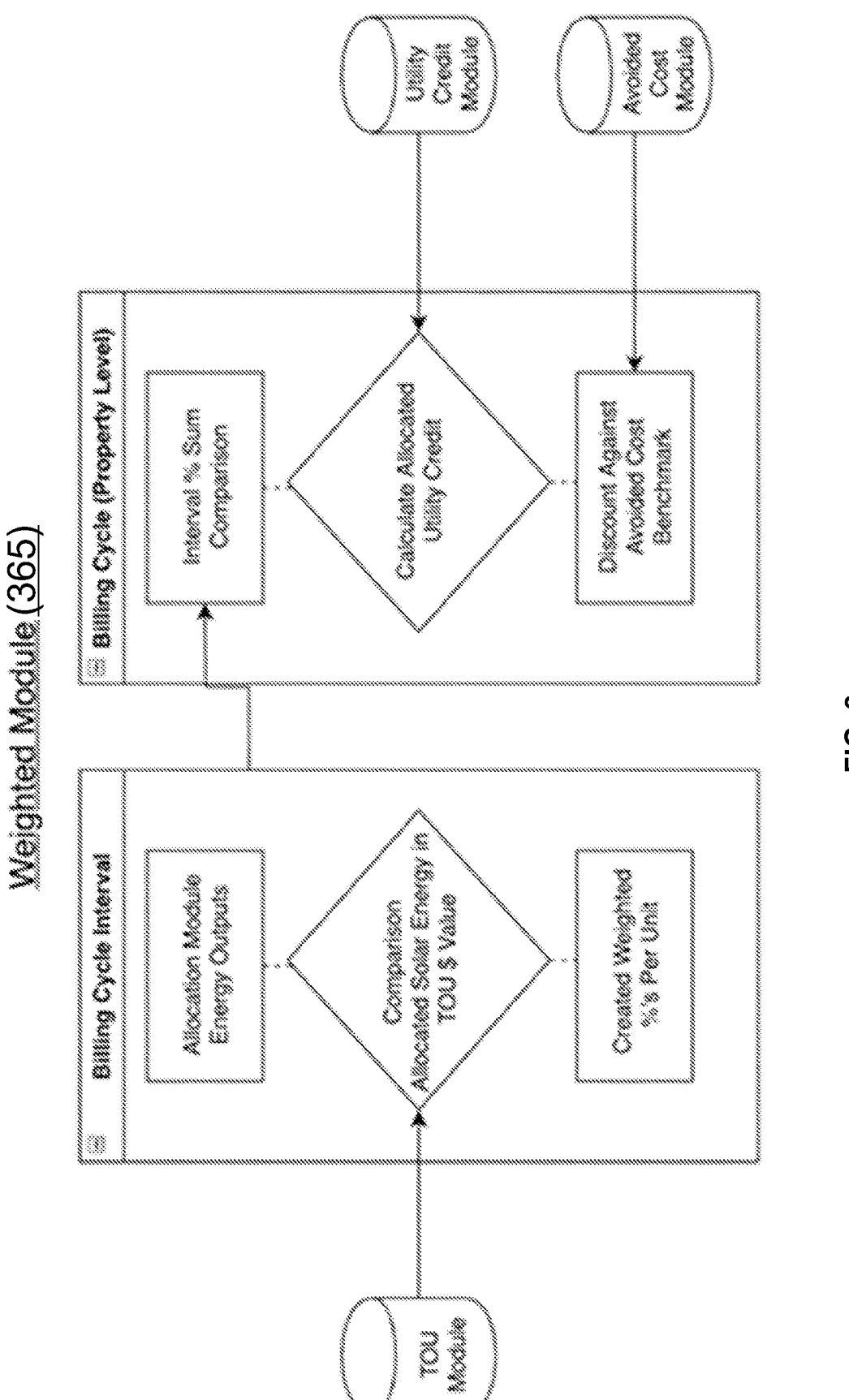
FIG. 8 is a diagram illustrating example functionality of a weighting module according to an embodiment of the invention.

FIG. 8 is a diagram illustrating an example functionality of the weighting module (365) functionality according to an embodiment of the invention. In the illustrated embodiment, process is outlined that is configured to distribute the shared financial incentives identified by the utility credit module based on unique usage behavior per user. This weighted module (365) will factor avoided time of use cost for allocated generation load as described in the allocation module. The core functionality of this weighted module (365) is weighting the unit usage loads against each other based on positive usage behavior and external utility pricing signals. A % value at the end of a billing cycle per unit will determine how much of the aggregated property utility credit will be associated to each user. The rules will be equally available to all and are based on real time energy pricing weighted by utility price reference. This weighting module (365) will update based on utility time of use updates to incorporate real time market pricing into the weighting calculation.

FIG. 9 is a diagram illustrating example storage repository segments of the energy data storage module (315) according to an embodiment of the invention. In the illustrated embodiment, the energy data storage module (315) and the objects relationship structure are shown. There are four main energy data objects; 1) The entire property or service delivery area. 2) A building within the property or service area. 3) A real estate unit that has a need to be identified separately within the service area usually because of lease obligation or disaggregated ownership. 4) An appliance or usage node within a unit.

Figure 10:
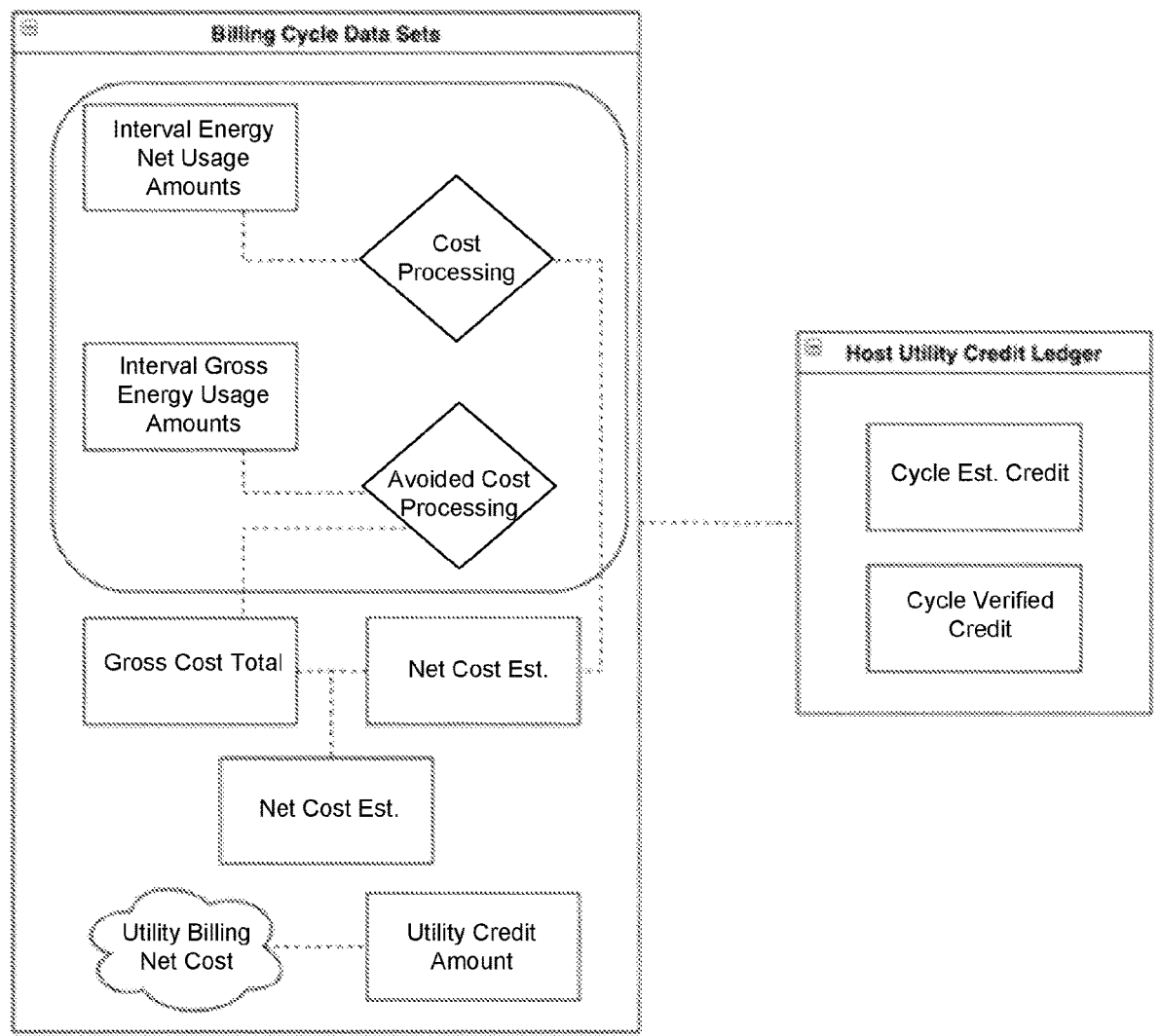
FIG. 10 is a diagram illustrating example functionality of a utility credit module according to an embodiment of the invention.

FIG. 10 is a diagram illustrating an example utility credit module (330) according to an embodiment of the invention. In the illustrated embodiment, the utility credit module (330) is configured to associate energy production data with the utility incentive schema of allocated energy generation on a property and identify the utility recorded value credited for produced energy. This module (330) will calculate as the utility would the end result as a total savings or credit generated per billing time period as the utility would have on record. The dollar amounts will be allocated to the entire service area and will then be used in the weighting module to generate individual user savings figures. This module (330) will create an estimated energy cost figure known as "Net" that includes the savings from solar off of the "gross" cost that would have been due to the utility. This figure will be available before the utility publishes their final NET amount due. This verified NET amount will be used in the weighting module and if the weighting module used the predetermined NET amount it will calculate the difference between the two and incorporate it into the next following billing cycle. This module (330) will adjust based on any net metering changes associated with physical tariff components and incentives.

Figure 11:
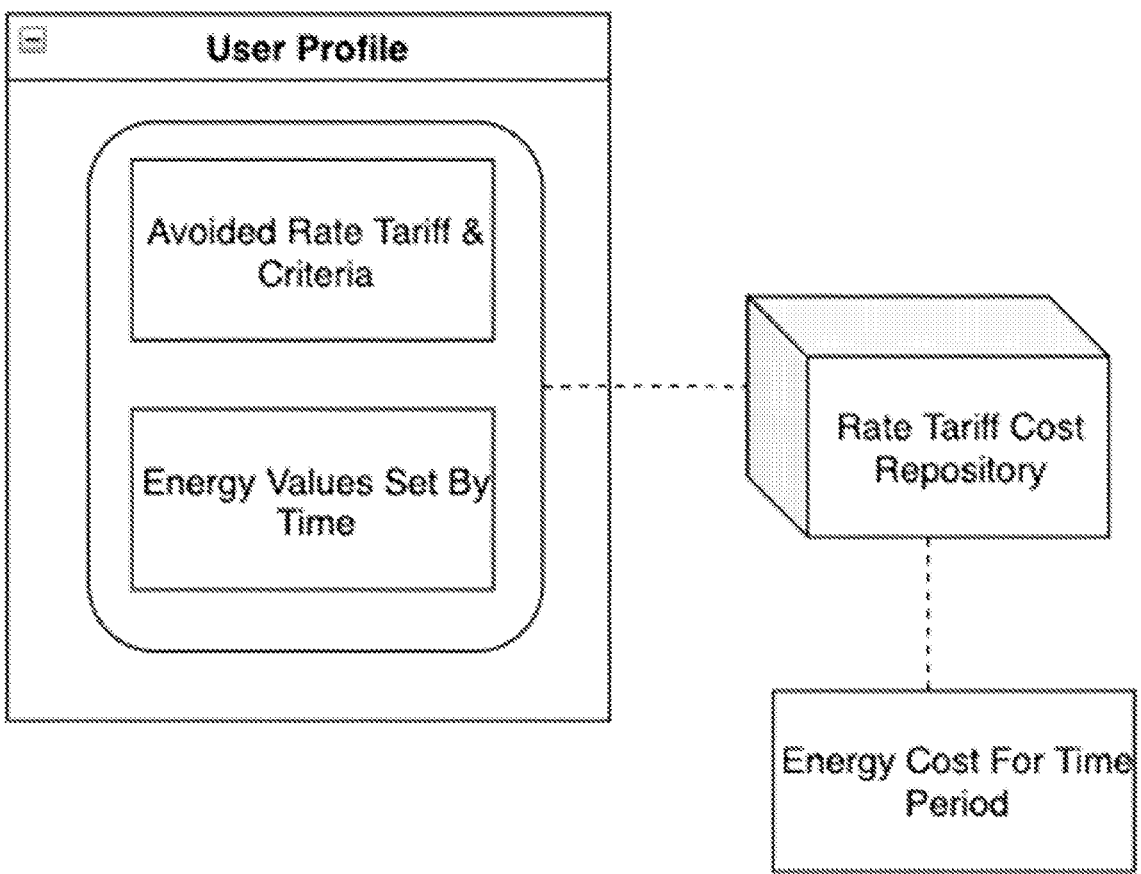
FIG. 11 is a diagram illustrating example functionality of an avoided cost module according to an embodiment of the invention.

FIG. 11 is a diagram illustrating an example avoided cost module (345) according to an embodiment of the invention. In the illustrated embodiment, the avoided cost module (345) is configured to determine the cost a user would have paid in energy cost on a certain utility tariff, based on the associated current reader's unique energy usage. This cost total does not factor solar production and is only based on gross consumption. This module (345) includes dynamic input fields that are adjusted based on the associated tariff's variable criteria needed to 100% accurately calculate the avoided tariff, and the module (345) will store and reference the criteria preferences based on the physical answers that a resident living in the associated unit has chosen inside of an interface module.

Figure 12:
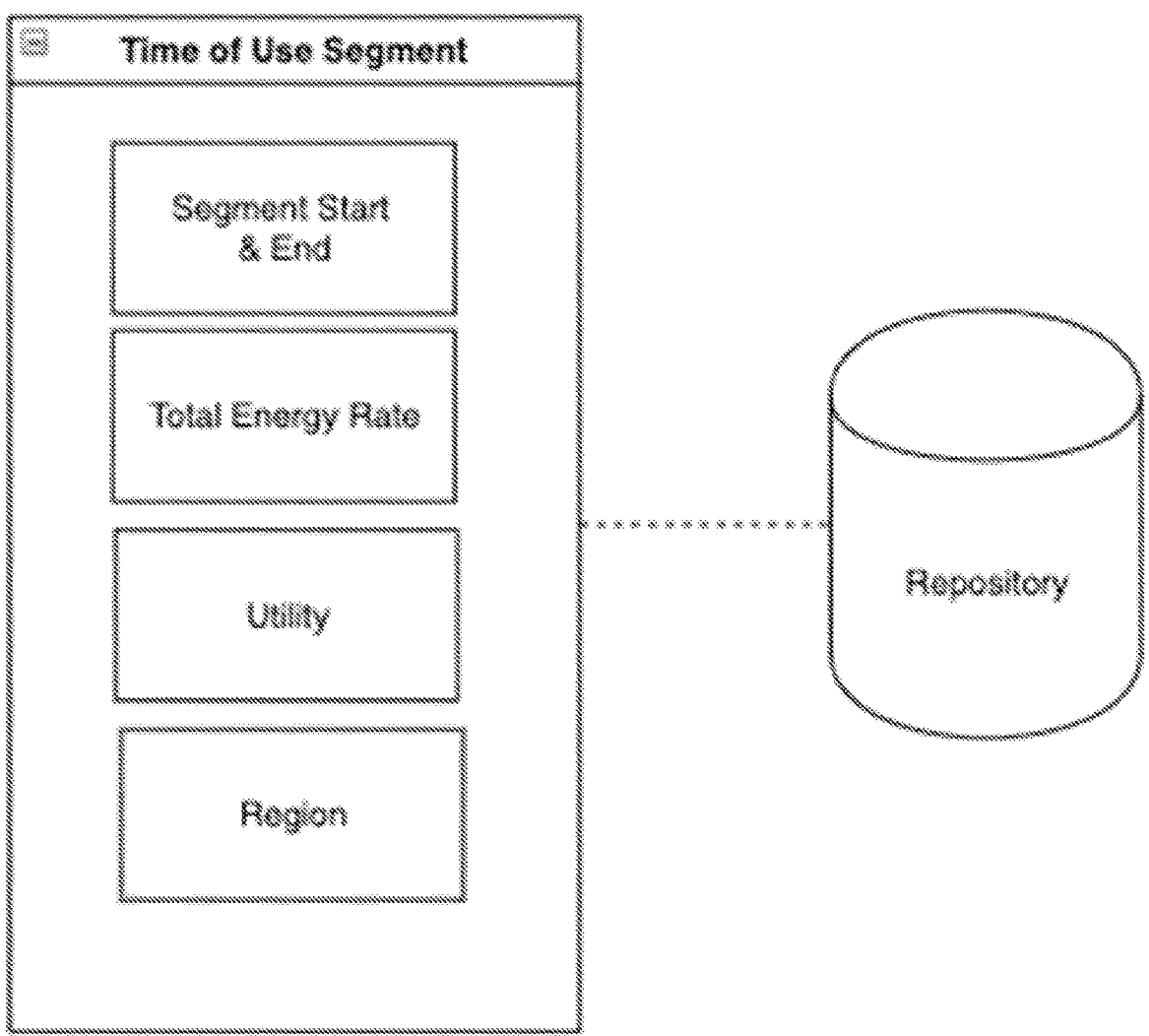
FIG. 12 is a diagram illustrating example functionality of a time of use module according to an embodiment of the invention.

FIG. 12 is a diagram illustrating an example time of use module (355) according to an embodiment of the invention. In the illustrated embodiment, the time of use module (355) is configured to pull data points from public utility tariffs, and store them per time of use segment. Time of use segments are determined based on a utility tariff and comprise a time period with a set energy cost per that time of use. A utility tariff is a rate structure associated to a utility company and this module (355) will pull relevant tariff data and keep the repository segment up to date with live tariffs being used in the regional locations that the ivy software server is contracted to function in.

Figure 13:
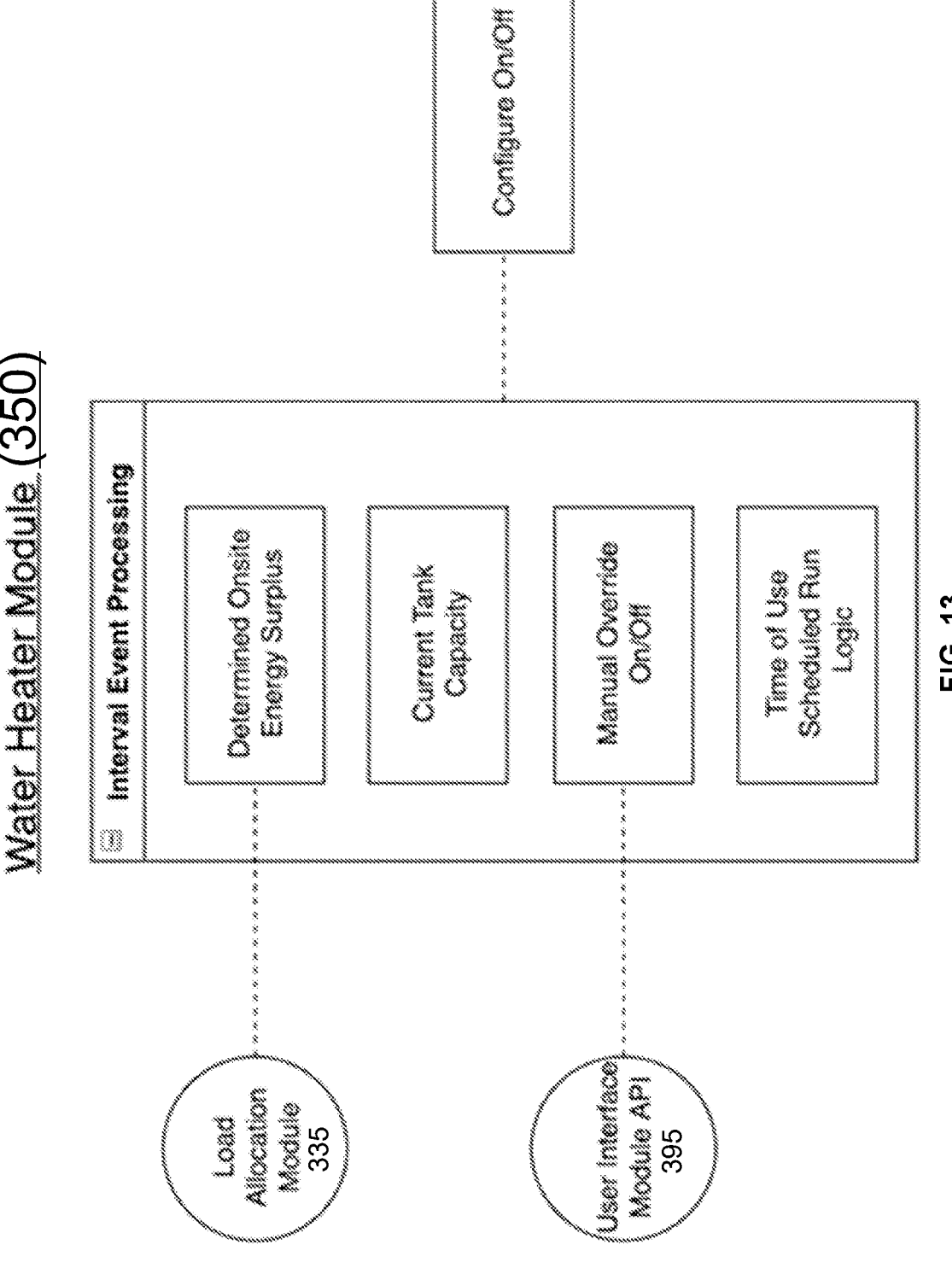
FIG. 13 is a diagram illustrating example functionality of a water heater module according to an embodiment of the invention.

FIG. 13 is a diagram illustrating an example water heater module (350) according to an embodiment of the invention. In the illustrated embodiment, the water heater module (350) is configured to use interval load outputs from the load allocation module (335) to determine when is the optimal time to heat water on an automated schedule based on surplus energy being generated on the property.

Figure 14:
FIG. 14 is a diagram illustrating example functionality of an appliance automation module according to an embodiment of the invention.

FIG. 14 is a diagram illustrating an example appliance automation module (375) according to an embodiment of the invention. In the illustrated embodiment, the appliance automation module (375) is configured to segment physical environments by property. This module (375) will run live event protocol to load control switches to turn off or reduce energy usage, battery management systems to increase stored current or discharge stored energy capacity, or user interfaces to prompt energy usage behavior change based on the following; Surplus onsite energy available within the physical environment as described in the load allocation module (335), utility or outside of physical environment pricing incentives to reduce energy usage such as the time of use module reference.

Figure 15:
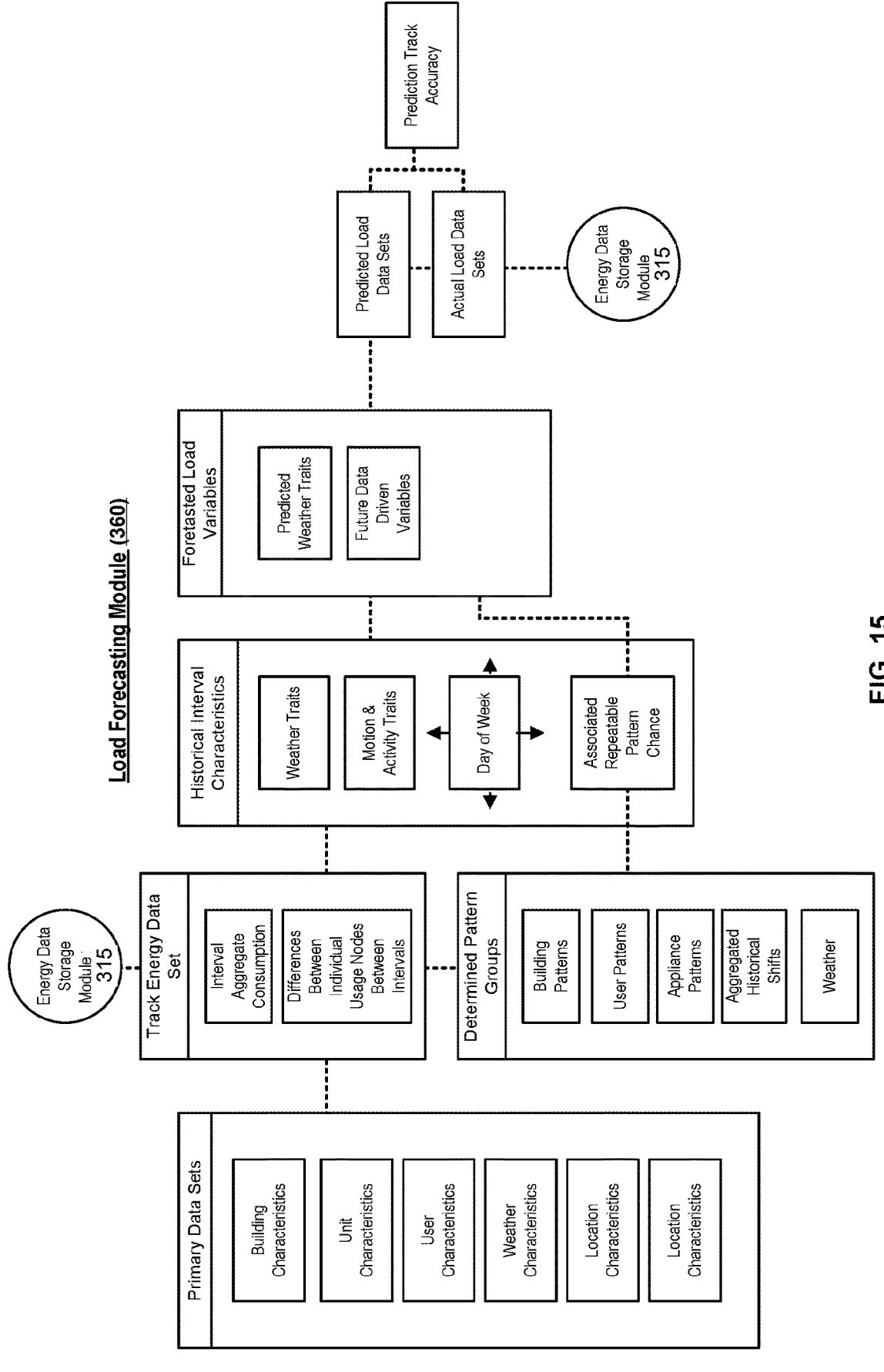
FIG. 15 is a diagram illustrating example functionality of a load forecasting module according to an embodiment of the invention.

FIG. 15 is a diagram illustrating an example load forecasting module (360) according to an embodiment of the invention. In the illustrated embodiment, the components used inside of the load forecasting module (360) are shown. This module (360) is configured to create prediction tracks that consist of a data formulation process that will have similar data points referenced in the figure below and is meant to associate energy usage and shift changes across energy. The goal of this module is to produce patterns that can be layered on top of live and other future data sets to predict and test prediction load usage and shifts in usage in a scoring system that is based on verified accuracy. This module (360) with a niche focus of optimizing energy usage behavior in the physical environment is described in FIG. 1.

FIG. 16 is a block diagram illustrating an example breakdown of total shared energy usage according to an embodiment of the invention. In the illustrated embodiment, a plurality of users have a total shared energy usage 1605 during a time period, for example a billing cycle. The users share energy produced by one or more DER producing assets supplemented by energy from the grid managed by the utility.

The breakdown of the cost of the total shared energy usage 1605 is divided between a non-avoided utility energy cost 1610 and an avoided utility energy cost 1615. Payment is made to the utility to cover the non-avoided utility energy cost 1610 and payment is made to the DER Host to cover at least a portion of the avoided utility energy cost 1615. FIGS. 17-21 will now be described to discuss alternative methods for determining how to allocate the shared benefit of the one or more DER producing assets to arrive at payment that is made to the DER host to cover at least a portion of the avoided utility energy cost 1615.

In accordance with the description of FIGS. 17-21, it should be noted that these methods may be carried out by a server system 200 such as previously described with respect to FIG. 5 and that the various steps of the methods illustrated in FIGS. 17-21 may be carried out by various modules of the server system 200.

FIG. 17 is a flow diagram illustrating an example process for allocating shared use DER benefits according to an embodiment of the invention. Initially at 1620 the server determines a fixed % of DER generation credits per unit in the multi-unit building. Next, at 1622 the system calculates a DER payment per unit using the fixed % of generation credits allocated per unit. For example, if there are 100 units, each unit may be allocated 1% of the DER generation credits and the DER payment is reduced by the value of 1% of the DER generation credits at 1622. Next, the tenant for each unit remits DER energy payments to the DER host at 1624 and the tenant for each unit also remits energy payments to the utility at 1626, although these last two steps can be in any order.

In one example embodiment, the DER generation credits are allocated to each unit using a fixed percentage. Then a fixed value per kWh is used to calculate the amount of DER generation kWh credits for each unit to determine the payment a tenant of a unit makes to the DER host. The tenant of each unit then makes a payment to the DER host and also to the utility.

FIG. 18 is a flow diagram illustrating an example process for allocating shared use DER benefits according to an embodiment of the invention. Initially, at 1630 the server obtains energy use data for each unit. Then at 1632 the server calculates the gross utility cost for the aggregate energy used by the multi-unit building for the time period, e.g., a billing cycle. The gross utility cost is the total energy used during the time period at the cost the utility would charge for that total energy used. Next, at 1634 the server determines a discount as a percentage or a flat dollar amount. The discount is based on the benefit of using energy from the one or more DER producing assets during the time period rather than getting that same energy from the utility. The server also applies the discount to the gross utility cost for each unit to reduce the cost of energy to each unit. Next, at 1636, the tenant for each unit remits a DER energy payment to the DER host and at 1638, the DER host remits energy payments to the utility, although these last two steps can be in any order.

In one example embodiment, energy usage data is collected at a residential unit level normally from a utility meter or current transformer in 15-60 minute time intervals. Then a reference is made to the public utility tariff associated to each tenant's billing profile and the Gross Utility Cost is calculated to determine the energy cost for each residential unit without the DER benefit. The server determines a flat percentage reduction or a fixed dollar amount to be deducted from the gross utility cost of a unit to determine the energy payment amount for each tenant. Then each tenant pays the DER host and the host in turn pays the utility.

Figures 19, 20:
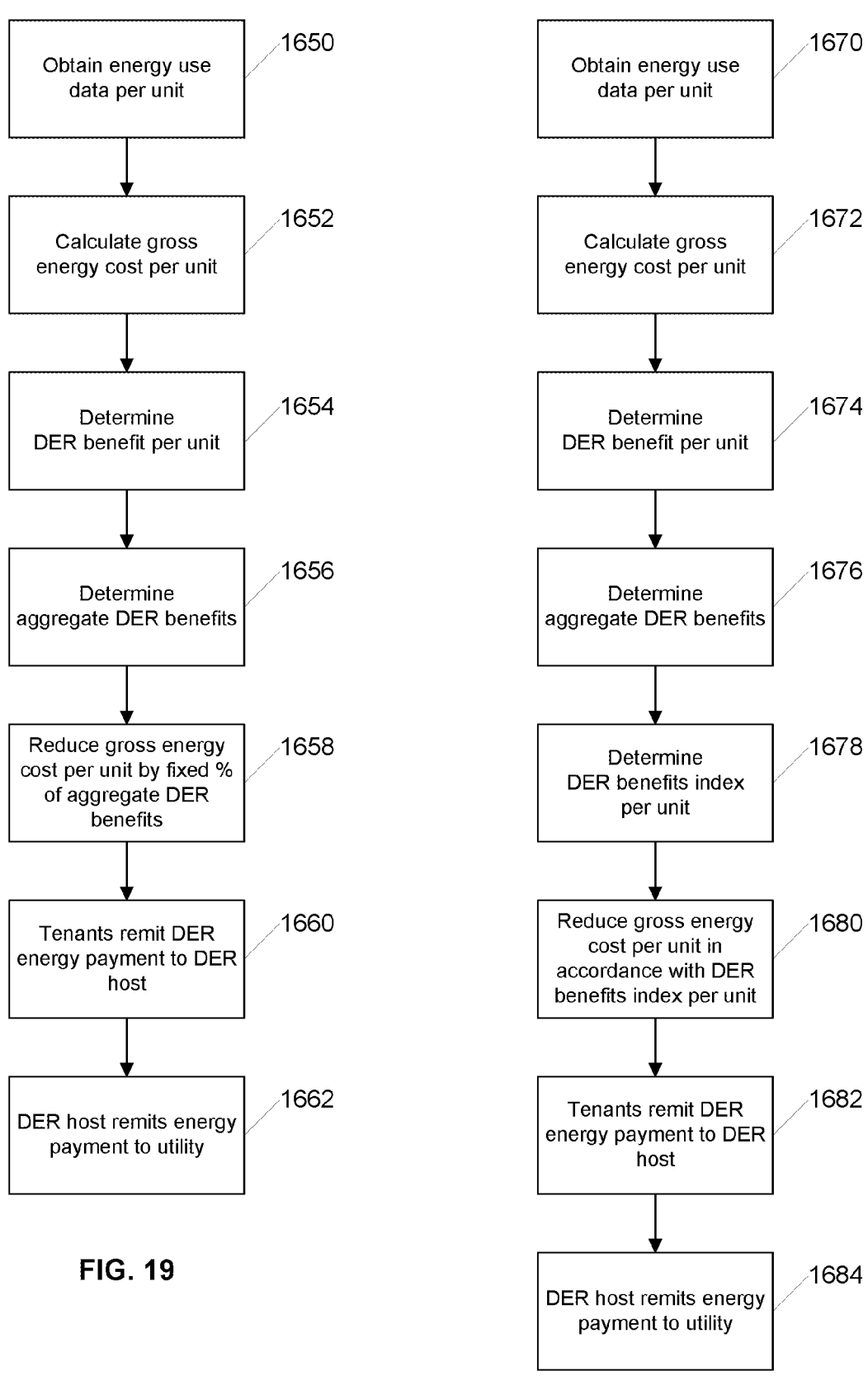
FIG. 19 is a flow diagram illustrating an example process for allocating shared use DER benefits according to an embodiment of the invention.
FIG. 20 is a flow diagram illustrating an example process for allocating shared use DER benefits according to an embodiment of the invention.

FIG. 19 is a flow diagram illustrating an example process for allocating shared use DER benefits according to an embodiment of the invention. Initially at 1650, the server obtains energy use data for each unit in the multi-unit building. Next at 1652, the server calculates the gross energy cost per unit. The gross energy cost for a unit is the amount that the utility would have charged the unit for energy use by the unit during the timer period, e.g., one billing cycle. Next, at 1654, the server determines the DER benefit per unit. In one embodiment, the DER benefit for a unit may be based on the relative energy use of that unit compared to all other units that share use of the one or more DER producing assets.

Next, at 1656 the server determines the aggregate DER benefits and then at 1658 the server reduces the gross energy cost per unit by a fixed percentage of the aggregate DER benefits previously determined. Subsequently, at 1660, the tenant for each unit remits a DER energy payment to the DER host and at 1662, the DER host remits energy payments to the utility, although these last two steps can be in any order.

In one example embodiment, energy usage data is collected at a residential unit level, for example, from a utility meter or current transformer in 15-60 minute time intervals during the time period. Then a reference is made to the public utility tariff associated to each tenant's billing profile and the Gross Utility Cost is calculated per unit without the DER benefits. The Gross Energy cost for a unit during the time period is then compared to Net Energy cost for the same unit, where the net energy cost is determined by reducing the gross energy cost based on the DER benefit for the unit. The difference between the gross energy cost and the net energy cost is the "Avoided Energy Cost". The sum of all the units avoided energy cost will be totaled into a total community energy savings. A fixed % of these total community energy savings are then deducted from the Gross Energy cost associated to each residential unit and then the tenant makes a corresponding DER payment to the DER host and the DER host makes a corresponding payment to the utility.

FIG. 20 is a flow diagram illustrating an example process for allocating shared use DER benefits according to an embodiment of the invention. Initially at 1670, the server obtains energy use data for each unit in the multi-unit building. Next at 1672, the server calculates the gross energy cost per unit. The gross energy cost for a unit is the amount that the utility would have charged the unit for energy use by the unit during the time interval, e.g., one billing cycle. Next, at 1674, the server determines the DER benefit index per unit. In one embodiment, the DER benefit index for a unit may be based on the relative energy use of that unit compared to all other units that share use of the one or more DER producing assets.

Next, at 1676 the server determines the aggregate DER benefits and then at 1678 the server determines the DER benefits index for each unit. There are a variety of ways to determine the DER benefits index for a unit and one such method is described with respect to FIG. 21. Next, at 1680, the server reduces the gross energy cost per unit in accordance with the DER benefits index for the respective unit and generates the DER energy payment amount for each unit. Subsequently, at 1682 the tenant for each unit remits a DER energy payment to the DER host and at 1684, the DER host remits energy payment to the utility, although these last two steps can be in any order.

In one example embodiment, energy usage data is collected at a tenant space (e.g., commercial or residential unit) level, for example from a utility meter or current transformer in 15-60 minute time intervals during the time period such as a billing cycle. Then a reference is made to the public utility tariff associated to the tenant's billing profile and the Gross Utility Cost is determined per unit without the DER benefit. The gross utility cost is then compared to a Net Utility cost that is determined based on the gross utility cost with the DER benefit. The net utility cost amount will determine the savings generated from the DER otherwise known as "Avoided Energy Cost". The sum of all avoided energy costs across all units is determined as the total community energy savings and each unit's relative share of the total community energy savings is applied to the unit's gross utility cost to determine the DER payment for each unit. This DER payment is then made by the tenant of each unit and the DER host makes a payment to the utility.

Figure 21:
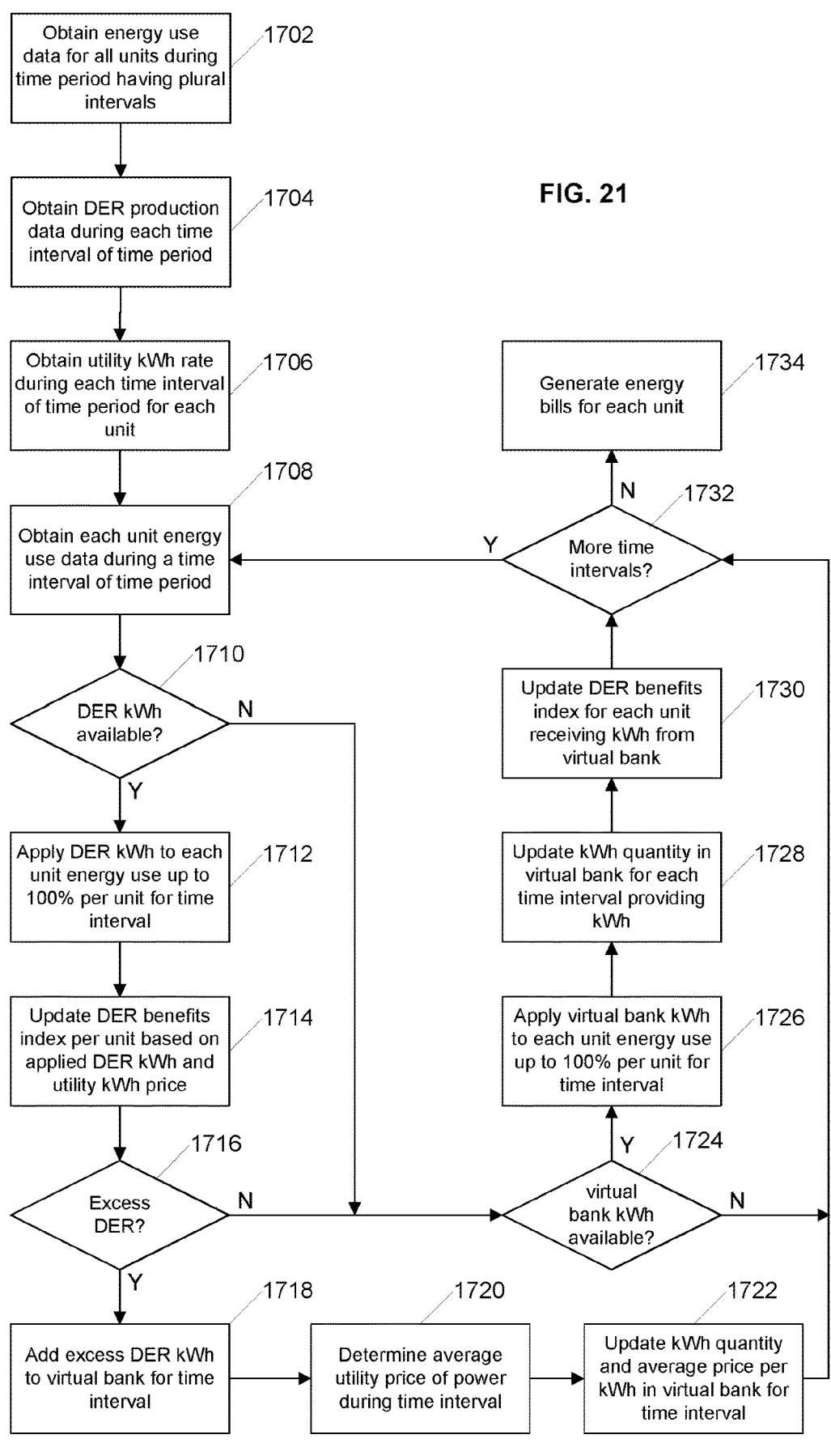
FIG. 21 is a flow diagram illustrating an example process for allocating shared use DER benefits according to an embodiment of the invention.

FIG. 21 is a flow diagram illustrating an example process for allocating shared use DER benefits according to an embodiment of the invention. Initially at 1702 the server obtains energy use data for each unit in the multi-unit building during a time period. A time period can be for example a billing cycle established by the utility. Other time periods may also be employed. The time period is divided into a plurality of intervals. For example, the time period may be divided into 60 minute intervals or it may be divided into 15 minute intervals. The granularity of an individual interval can be very small, for example 30 seconds or even 1 second. In one embodiment, the server divides the time period into time intervals based on pricing time intervals established by the utility. For example, the utility may adjust kWh pricing every 60 minutes or every 120 minutes or every 15 minutes.

Next, at 1704 the server obtains DER production data from the one or more shared DER production assets. The DER production data may be originally produced in desired time intervals or the server may concat and/or divide the DER production data into the desired time interval, for example, the time interval that was used for the energy use data. For example, if the energy use data for a time period was divided into time intervals of 15 minutes, the DER production data is similarly divided into time intervals of 15 minutes.

Next, at 1706 the server obtains kWh pricing information for the utility for each time interval during the time period. Accordingly, if the previously established time interval was 15 minutes, then the server obtains the kWh price of energy from the utility for each time interval during the time period.

Next, at 1708, the server obtains the energy use data for each unit during a first time interval of the time period. For example, if the time period is 30 days and the time interval is 15 minutes, then there are 96 time intervals per day and 2,880 time intervals for the time period. At 1708, the server obtains the energy use data for each unit during time interval 1 of 2,880.

Next, at 1710 the server determines if there was DER kWh available during the first time interval. If the one or more shared DER production assets were producing energy during the time interval, then there is some amount of DER kWh available during the time period and at 1712, the server applies the available DER kWh to each unit. The application of available kWh to each unit may be carried out in a variety of ways. In one embodiment, kWh are applied equally to each unit up to 100% of a unit's energy usage during the time period. For example, if there were 10 units and 50 available DER kWh and each unit used 5 kWh during the time interval, then each unit would have 5 kWh of the available DER kWh applied. Alternatively, if there were 10 units and 50 available DER kWh and each unit used 10 kWh during the time interval, then each unit would have 5 kWh of the available DER kWh applied and each unit would have 5 kWh remaining during the time interval. Alternatively, if there were 10 units and 50 available DER kWh and 5 units used 5 kWh during the time interval and 5 units used 10 kWh during the time interval, then each unit would have 5 kWh of the available DER kWh applied and 5 of the units would have 5 kWh remaining during the interval.

Next, after applying the available DER kWh to all of the units, at 1714 the server updates the DER benefits index per unit based on the DER kWh benefit that was applied to each individual unit for the particular time period and the utility price of a kWh of energy for the particular time interval. In one embodiment, the DER benefits index is calculated by summing the price of each quantity of DER kWh applied to the unit by the server and the price of each quantity of virtual bank kWh applied to the unit by the server during the time period.

Also after applying the available DER kWh to all of the units, at 1716 the server determines if there is excess DER kWh during the time interval. It should be noted that it is unlikely that the DER kWh production and the total energy use across all units is identical, however if they are identical, then the process jumps to 1732 to determine if there are more time intervals during the time period and if there are, the process begins again at 1708 with the next time interval during the time period. In the case where there is no excess DER kWh as determined at 1716, and the production and use was not identical so there are additional kWh used by the units during the time interval, the process jumps forward to 1724, which will be explained below.

At 1718, after the server determines that there is excess DER kWh produced during the time interval, the server adds the excess DER kWh to a virtual bank for the time interval. The virtual bank is maintained by the server to account for variations in energy production by the one or more shared DER production assets and overall usage by the various units in the multi-unit building. The server also maintains average utility pricing information for each time interval. Importantly, in some instances, each individual unit may have a different kWh price for energy from the utility during the same time period due to complexities with tariffs and other energy pricing laws and regulations. Accordingly, for each time interval, the server maintains a virtual bank of excess kWh produced by the shared DER production assets and for each time interval, the server maintains a quantity of kWh and an average price per kWh. For example, if the server is using 96 time intervals (i.e., 15 minute intervals), then there are 96 discrete virtual banks.

At 1720, after determining how much excess kWh will be added to the virtual bank for the particular time interval, the server determines the average utility price per kWh for the particular time interval and then at 1722, the server updates the quantity of kWh in the virtual bank for the time interval and the also updates the average price of a kWh in the virtual bank for the time interval. Because there was excess DER kWh and after the excess DER kWh are added to the virtual bank, the process jumps forward to 1732 to determine if there are more time intervals during the time period and if there are, the process begins again at 1708 with the next time interval during the time period.

If the server determines that there is no DER kWh available for the particular time interval at 1710 or the server determines at 1716 that there is no excess DER kWh (and the available DER kWh is not identical to the total energy use during the time interval), the server determines at 1724 if there is any virtual bank kWh available. If there is no kWh available in the virtual bank, the process jumps to 1732 to determine if there are more time intervals during the time period and if there are, the process begins again at 1708 with the next time interval during the time period.

If the server determines at 1724 that there is kWh available in the virtual bank, at 1726 the server applies available kWh in the virtual bank to each unit. The application of available kWh from the virtual bank to each unit may be carried out in a variety of ways. In one embodiment, available kWh can be applied equally to each unit up to 100% of a unit's energy usage during the time period as previously described.

In one embodiment, a difference between application of DER kWh to the units and application of virtual bank kWh is the time interval. For example, when the DER kWh are being applied, the available DER kWh is only from the current time interval. In contrast, when virtual bank kWh are being applied, the kWh may come from the current time interval or a different time interval. In one embodiment, the server is configured to first select available virtual bank kWh from the current time interval and if there is no available virtual bank kWh from the current time interval, then the server is configured to select available virtual bank kWh from the current time interval on a different day during the time period, and if there is no available virtual bank kWh from the current time interval on a different day during the time period, then the server is configured to select the lowest price kWh that is available from the virtual bank during the time period.

In an alternative embodiment, the server is configured to first select available virtual bank kWh from the current time interval and if there is no available virtual bank kWh from the current time interval, then the server is configured to select available virtual bank kWh from the current time interval on a different day during the time period, and if there is no available virtual bank kWh from the current time interval on a different day during the time period, then the server is configured to select the closest price kWh that is available from the virtual bank during the time period.

Next, at 1728, the server updates the quantity of kWh in the virtual bank for each time interval from which available kWh were applied and the server the also updates the average price of a kWh in the virtual bank for each time interval from which available kWh were applied.

Next, at 1730, the server updates the DER benefits index for each unit that received available kWh from the virtual bank based on the quantity of kWh applied from the virtual bank and the average price of each kWh of energy applied to the unit.

Advantageously, the virtual bank maintains for each time interval during the time period, a quantify of available kWh and an average price of a kWh in each time interval. In one embodiment, the DER benefits index is calculated by summing the price of each quantity of DER kWh applied to the unit by the server and the price of each quantity of virtual bank kWh applied to the unit by the server during the time period.

Next, at 1732 the server determines if there are more time intervals during the time period and if there are, the process begins again at 1708 with the next time interval during the time period. If there are no additional time intervals for the time period, at 1734 the server begins the process of generating individual energy bills having a DER payment amount for each unit.

In one example embodiment, a full billing time period of energy usage data is collected across all time intervals during the time period, where the time interval can be of any duration between 30 second intervals and 60 minute intervals. After collection of the energy use data, the benefit of energy production by the shared one or more DER production assets is applied to the various units. Initially, the server determines the total energy use for each unit for each time interval during the time period. Then the server determines if DER kWh production was available during the time interval and if so, how much. If DER kWh was available, the kWh is distributed equally to every unit until the unit's total energy use during the time interval is met 100% with DER energy production. If one unit's energy use is fully met during a time interval, the server continues to equally apply the DER kWh to any remaining units with additional kWh usage until the energy usage of all units has been 100% met or until the DER kWh production has been 100% allocated.

Once the DER kWh allocations are made to the units, the kWh value is referenced to an associated utility rate schedule and a contribution is made to the virtual price sum for the billing time period. If all energy usage is met and there is still remaining DER kWh production for that time period, the remaining DER kWh are contributed to the particular time interval repository in a virtual energy bank maintained by the server. When contributing DER kWh to the virtual bank, the server identified the kWh price for all units and determines an average cost of energy per kWh for the time interval across the entire community and then makes the virtual energy bank contribution with the attributes of a quantify of kWh and an average cost per kWh for the particular time interval.

If all of the DER kWh production during the time interval is allocated to units and the usage is not 100% met across all units, then the server makes deductions from the virtual energy bank and applies additional kWh from the virtual energy bank to the units where usage during the time interval is not 100% met. The server is configured to apply available kWh from the virtual bank in the following order: 1) the current time interval on any other day during the time period; and 2) the lowest price per kWh in the virtual bank until. Available kWh hours from the virtual bank are applied to the energy use of any units with remaining energy use until the bank is empty or all unit usage has been 100% met. As allocations of kWh from the various time intervals in the virtual bank are applied to units, the DER benefit index of the unit is updated based on the quantity of kWh's applied and the corresponding average kWh price of the kWh applied from the virtual bank.

The server follows the same process for all time intervals in the billing time period and once the application of all DER kWh and virtual bank kWh is completed, the server finalizes the DER benefit index for each unit for the particular time period, after which the server is configured to determine the final DER payment amount for each unit for the time period.

Figure 22:
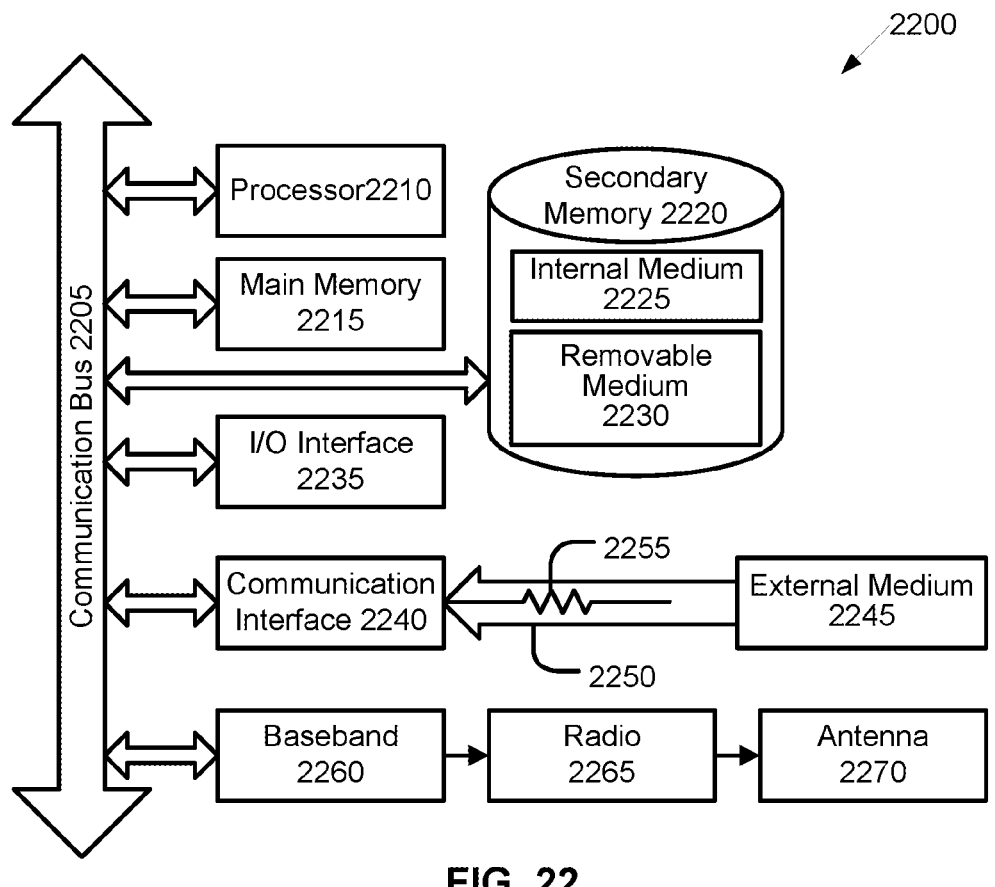
FIG. 22 is a block diagram illustrating an example wired or wireless system that may be used in connection with various embodiments described herein.

FIG. 22 is a block diagram illustrating an example wired or wireless system 2200 that may be used in connection with various embodiments described herein. For example, system 2200 may be used as or in conjunction with one or more of the functions, processes, or methods (e.g., to store and/or execute the application or one or more software modules of the application) described herein, and may represent components of the virtual grid server, utility server, gateway, control switch, current reader, energy usage node, and the like as previously described and/or other processing devices described herein. System 2200 can be a server or any conventional personal computer, or any other processor-enabled device that is capable of wired or wireless data communication. Other computer systems and/or architectures may be also used, as will be clear to those skilled in the art.

System 2200 preferably includes one or more processors, such as processor 2210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 2210. Examples of processors which may be used with system 2200 include, without limitation, the Pentium® processor, Core i7® processor, and Xeon® processor, all of which are available from Intel Corporation of Santa Clara, California.

Processor 2210 is preferably connected to a communication bus 2205. Communication bus 2205 may include a data channel for facilitating information transfer between storage and other peripheral components of system 2200. Furthermore, communication bus 2205 may provide a set of signals used for communication with processor 2210, including a data bus, address bus, and/or control bus (not shown). Communication bus 2205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 2200 preferably includes a main memory 2215 and may also include a secondary memory 2220. Main memory 2215 provides storage of instructions and data for programs executing on processor 2210, such as one or more of the functions and/or modules discussed herein. It should be understood that programs stored in the memory and executed by processor 2210 may be written and/or compiled according to any suitable language, including without limitation CIC++, Java, JavaScript, Perl, Visual Basic, .NET, and the like. Main memory 2215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 2220 may optionally include an internal medium 2225 and/or a removable medium 2230. Removable medium 2230 is read from and/or written to in any well-known manner. Removable storage medium 2230 may be, for example, a magnetic tape drive, a compact disc (CD) drive, a digital versatile disc (DVD) drive, other optical drive, a flash memory drive, and/or the like.

Secondary memory 2220 is a non-transitory computer-readable medium having computer-executable code (e.g., disclosed software modules) and/or other data stored thereon. The computer software or data stored on secondary memory 2220 is read into main memory 2215 for execution by processor 2210.

In alternative embodiments, secondary memory 2220 may include other similar means for allowing computer programs or other data or instructions to be loaded into system 2200. Such means may include, for example, a communication interface 2240, which allows software and data to be transferred from external storage medium 2245 to system 2200. Examples of external storage medium 2245 may include an external hard disk drive, an external optical drive, an external magneto-optical drive, and/or the like. Other examples of secondary memory 2220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 2200 may include a communication interface 2240. Communication interface 2240 allows software and data to be transferred between system 2200 and external devices (e.g. printers), networks, or other information sources. For example, computer software or executable code may be transferred to system 2200 from a network server (e.g., virtual grid server 200) via communication interface 2240. Examples of communication interface 2240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 2200 with a network (e.g., network(s) 120) or another computing device. Communication interface 2240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 2240 are generally in the form of electrical communication signals 2255. These signals 2255 may be provided to communication interface 2240 via a communication channel 2250. In an embodiment, communication channel 2250 may be a wired or wireless network (e.g., network(s) 120), or any variety of other communication links. Communication channel 2250 carries signals 2255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 2215 and/or secondary memory 2220. Computer programs can also be received via communication interface 2240 and stored in main memory 2215 and/or secondary memory 2220. Such computer programs, when executed, enable system 2200 to perform the various functions of the disclosed embodiments as described elsewhere herein.

In this description, the term "computer-readable medium" is used to refer to any non-transitory computer-readable storage media used to provide computer-executable code and/or other data to or within system 2200. Examples of such media include main memory 2215, secondary memory 2220 (including internal memory 2225, removable medium 2230, and external storage medium 2245), and any peripheral device communicatively coupled with communication interface 2240 (including a network information server or other network device). These non-transitory computer-readable media are means for providing executable code, programming instructions, software, and/or other data to system 2200.

In an embodiment that is implemented using software, the software may be stored on a computer-readable medium and loaded into system 2200 by way of removable medium 2230, 1/0 interface 2235, or communication interface 2240. In such an embodiment, the software is loaded into system 2200 in the form of electrical communication signals 2255. The software, when executed by processor 2210, preferably causes processor 2210 to perform one or more of the processes and functions described elsewhere herein.

In an embodiment, 1/0 interface 2235 provides an interface between one or more components of system 2200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 2200 may also include optional wireless communication components that facilitate wireless communication over a voice network and/or a data network (e.g., gateway system(s) 110). The wireless communication components comprise an antenna system 2270, a radio system 2265, and a baseband system 2260. In system 2200, radio frequency (RF) signals are transmitted and received over the air by antenna system 2270 under the management of radio system 2265.

In an embodiment, antenna system 2270 may comprise one or more antennae and one or more multiplexors (not shown) that perform a switching function to provide antenna system 2270 with transmit and receive signal paths. In the receive path, received RF signals can be coupled from a multiplexor to a low noise amplifier (not shown) that amplifies the received RF signal and sends the amplified signal to radio system 2265.

In an alternative embodiment, radio system 2265 may comprise one or more radios that are configured to communicate over various frequencies. In an embodiment, radio system 2265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 2265 to baseband system 2260.

If the received signal contains audio information, then baseband system 2260 decodes the signal and converts it to an analog signal. Then the signal is amplified and sent to a speaker. Baseband system 2260 also receives analog audio signals from a microphone. These analog audio signals are converted to digital signals and encoded by baseband system 2260. Baseband system 2260 also encodes the digital signals for transmission and generates a baseband transmit audio signal that is routed to the modulator portion of radio system 2265. The modulator mixes the baseband transmit audio signal with an RF carrier signal, generating an RF transmit signal that is routed to antenna system 2270 and may pass through a power amplifier (not shown). The power amplifier amplifies the RF transmit signal and routes it to antenna system 2270, where the signal is switched to the antenna port for transmission.

Baseband system 2260 is also communicatively coupled with processor 2210, which may be a central processing unit (CPU). Processor 2210 has access to data storage areas 2215 and 2220. Processor 2210 is preferably configured to execute instructions (i.e., computer programs, such as the disclosed application, or software modules) that can be stored in main memory 2215 or secondary memory 2220. Computer programs can also be received from baseband processor 2260 and stored in main memory 2210 or in secondary memory 2220, or executed upon receipt. Such computer programs, when executed, enable system 2200 to perform the various functions of the disclosed embodiments.

It should be understood that the previously described processes may be embodied in one or more software modules that are executed by one or more hardware processors (e.g., processor 2210), for example, the server modules discussed herein (e.g., server modules 305-397)), which may be executed wholly by processor(s) of the virtual grid server, utility server, gateway, control switch, current reader, energy usage node, and the like as previously described, or may be distributed across these processors such that some portions or modules of the application are executed by the virtual grid server and other portions or modules of the application are executed by other processor(s) on other devices. The described processes may be implemented as instructions represented in source code, object code, and/or machine code. These instructions may be executed directly by hardware processor(s) 2210, or alternatively, may be executed by a virtual machine operating between the object code and hardware processors 2210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A virtual energy grid system for a location comprising a plurality of tenant spaces in a building at the location, the location receiving grid energy from a utility grid and renewable energy produced by a renewable energy source associated with the location, the system comprising:

a computer system in electrical communication with a plurality of energy consumption meters, each energy consumption meter measuring energy use by a respective tenant space among the plurality of tenant spaces in the building;

the computer system in electrical communication with an energy production meter, the energy production meter measuring the renewable energy produced by the renewable energy source associated with the location;

the computer system configured to receive, from the energy production meter, energy production information of the renewable energy produced by the renewable energy source during a time period;

the computer system comprising an appliance automation module configured to, based on the energy production information of the renewable energy produced by the renewable energy source, send a signal to automatically energize or de-energize energy-consuming devices in at least one of: one or more tenant spaces or the building to increase usage of the renewable energy produced by the renewable energy source with respect to the grid energy by the at least one of: the one or more tenant spaces or the building;

the computer system configured to receive:

from each energy consumption meter, energy consumption information for each energy meter's respective tenant space during the time period;

a total amount of the renewable energy produced by the renewable energy source during the time period; and a total amount of grid energy supplied by the utility grid and used by the building during the time period; and the computer system configured to:

calculate an energy benefit allocation for each tenant space using the energy production information and the energy consumption information; and output a report for the time period for each tenant space that includes the respective tenant space's energy benefit allocation based on the energy consumption information of the respective tenant space during the time period, the total amount of the renewable energy produced by the renewable energy source during the time period, and the total amount of grid energy supplied by the utility grid and used by the building during the time period.

2. The system of claim 1, wherein the energy benefit allocation for each tenant space is calculated using grid energy consumption information, the grid energy consumption information including grid energy used by the tenant space supplied by the virtual energy grid.

3. The system of claim 2, wherein the energy benefit allocation comprises a price of the grid energy and the renewable energy used by the tenant space supplied by the virtual energy grid during the time period.

4. The system of claim 3, wherein the energy benefit allocation takes into account grid energy and renewable energy used by common areas of the location that are shared by the tenant spaces.

5. The system of claim 1, wherein the tenant spaces are in a multi-unit structure.

6. The system of claim 1, wherein the tenant spaces are properties in a community.

7. The system of claim 1, wherein the computer system is further configured to:

calculate an excess renewable energy produced by the renewable energy source during the time period; and credit at least a portion of the excess renewable energy to each tenant space by allocating an economic value of excess renewable energy exported to the utility grid to each tenant space based on the respective energy benefit allocation of each tenant space.

8. The system of claim 7, further comprising a battery associated with the renewable energy source, the battery being configured to store the excess energy.

9. The system of claim 1, wherein:

each tenant space has a per space per time interval price of energy; and a first per space per time interval price of energy for a first tenant space is not equal to a second per space per time interval price of energy for a second tenant space.

10. The system of claim 1, wherein the computer system is further configured to:

weight each tenant space's usage load against the other tenant space's usage loads using positive usage behavior and external utility pricing signals; and distribute a shared financial incentive to a tenant space using the tenant space's weighted usage.

11. The system of claim 1, wherein the computer system is further configured to:

determine an avoided energy cost representing energy supplied by the renewable energy source instead of the utility grid;

wherein each tenant space's relative share of the avoided energy cost is used to determine a benefit payment to the tenant space taking into account its energy benefit allocation.

12. The system of claim 1, wherein:

the computer system is in electronic communication with the energy consumption meters and the energy production meter over the Internet;

the computer system comprises one or more cloud-based servers; and functionality of the computer system is provided to the plurality of tenant spaces as a service.

13. The system of claim 12, the computer system comprising a user interface that allows a user to view data of the virtual energy grid system.

14. The system of claim 1, wherein the computer system comprises a plurality of networked processors.

15. A virtual energy grid system for a location comprising a plurality of tenant spaces in a building at the location, the location receiving grid energy from a utility grid and renewable energy produced by a renewable energy source associated with the location, comprising:

a computer system in electrical communication with a plurality of energy consumption meters, each energy consumption meter measuring energy use by a respective tenant space among the plurality of tenant spaces in the building;

the computer system in electrical communication with an energy production meter, the energy production meter measuring the renewable energy produced by the renewable energy source associated with the location;

the computer system configured to receive, from the energy production meter, energy production information of the renewable energy produced by the renewable energy source during a time period;

the computer system comprising an appliance automation module configured to, based on the energy production information of the renewable energy produced by the renewable energy source, automatically send a signal to automatically energize or de-energize energy-consuming devices in at least one of: one or more tenant spaces or the building to increase usage of the renewable energy produced by the renewable energy source with respect to the grid energy by the at least one of: the one or more tenant spaces or the building;

the computer system configured to receive:

from each energy consumption meter, energy consumption information for each energy meter's respective tenant space during the time period;

a total amount of the renewable energy produced by the renewable energy source during the time period; and a total amount of grid energy supplied by a utility grid and used by the building during the time period;

the computer system configured to calculate an excess energy produced by the renewable energy source during the time period and credit at least a portion of the excess energy to each tenant space; and the computer system configured to:

calculate an energy benefit allocation for each tenant space using the energy production information, the energy consumption information, and the credited excess energy amount; and output a report for the time period for each tenant space that includes the respective tenant space's energy benefit allocation based on the energy consumption information of the respective tenant space during the time period, the total amount of the renewable energy produced by the renewable energy source during the time period, and the total amount of grid energy supplied by the utility grid and used by the building during the time period.

16. The system of claim 15, wherein:

each tenant space has a per space per time interval price of energy; and a first per space per time interval price of energy for a first tenant space is not equal to a second per space per time interval price of energy for a second tenant space.

17. The system of claim 15, wherein the computer system is further configured to:

weight each tenant space's usage loads against the other tenant space's usage loads using positive usage behavior and external utility pricing signals; and distribute a shared financial incentive to a tenant space using the tenant space's weighted usage.

18. The system of claim 15, wherein the computer system is further configured to:

determine an avoided energy cost representing energy supplied by the renewable energy source instead of the utility grid, wherein each tenant space's relative share of the avoided energy cost is used to determine a benefit payment to the tenant space taking into account its energy benefit allocation.

19. An electrical system, comprising:

the virtual energy grid system for a location comprising a plurality of tenant spaces in a building at the location according to claim 15; and a utility meter respectively associated with each tenant space and in electrical communication with the respective tenant space's associated energy consumption meter, the utility meter measuring energy used by the respective tenant space among the plurality of tenant spaces in the building that is supplied by the grid or the renewable energy source.

20. A method for operating a virtual energy grid system for a location comprising a plurality of tenant spaces in a building at the location, the location receiving grid energy from a utility grid and renewable energy produced by a renewable energy source associated with the location, the method comprising:

providing a computer system in electrical communication with a plurality of energy consumption meters, each energy consumption meter measuring energy use by a respective tenant space among the plurality of tenant spaces in the building;

the computer system in electrical communication with an energy production meter, the energy production meter measuring the renewable energy produced by the renewable energy source associated with the location;

receiving with the computer system, from the energy production meter, energy production information of the renewable energy produced by the renewable energy source during a time period;

automatically performing, by the computer system with an appliance automation module, based on the energy production information of the renewable energy produced by the renewable energy source, one or more of:

controlling at least one control switch to turn off or reduce energy consumption for one or more of the plurality of tenant spaces; or controlling at least one battery management system to increase usage of the renewable energy produced by the renewable energy source with respect to the grid energy used by the building;

receiving with the computer system:

from each energy consumption meter, energy consumption information each energy meter's respective tenant space during the time period;

a total amount of the renewable energy produced by the renewable energy source during the time period; and a total amount of grid energy supplied by the utility grid and used by the building during the time period;

calculating with the computer system an excess of the renewable energy produced by the renewable energy source during the time period and crediting at least a portion of the excess of the renewable energy to each tenant space;

calculating with the computer system an energy benefit allocation for each tenant space using the energy production information, the energy consumption information, and the credited excess energy amount; and outputting with the computer system a report for the time period for each tenant space that includes the respective tenant space's energy benefit allocation based on the energy consumption information of the respective tenant space during the time period, the total amount of the renewable energy produced by the renewable energy source during the time period, and the total amount of grid energy supplied by the utility grid and used by the building during the time period.

21. The method of claim 20, wherein:

each tenant space has a per space per time interval price of energy; and a first per space per time interval price of energy for a first tenant space is not equal to a second per space per time interval price of energy for a second tenant space.

22. The method of claim 20, further comprising:

determining an avoided energy cost representing energy supplied by the renewable energy source instead of the utility grid, wherein each tenant space's relative share of the avoided energy cost is used to determine a benefit payment to the tenant space taking into account its energy benefit allocation.

\* \* \* \* \*